US012669052B2

(12) United States Patent
Mu et al.

(10) Patent No.: US 12,669,052 B2
(45) Date of Patent: Jun. 30, 2026

(54) SYSTEMS AND METHODS FOR DETECTING ABNORMAL FLOWBACK

(71) Applicant: Schlumberger Technology Corporation, Sugar Land, TX (US)

(72) Inventors: Chao Mu, Beijing (CN); Florian Le Blay, Clamart (FR); Tao Yu, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 358 days.

(21) Appl. No.: 18/343,870

(22) Filed: Jun. 29, 2023

(65) Prior Publication Data

US 2024/0003246 A1 Jan. 4, 2024

Related U.S. Application Data

(60) Provisional application No. 63/367,346, filed on Jun. 30, 2022.

(51) Int. Cl.
*E21B 47/10* (2012.01)
*G08B 21/18* (2006.01)

(52) U.S. Cl.
CPC ............ *E21B 47/10* (2013.01); *G08B 21/182* (2013.01)

(58) Field of Classification Search
CPC .......... E21B 47/10; E21B 44/00; E21B 21/08; G08B 21/182
See application file for complete search history.

(56) References Cited

U.S. PATENT DOCUMENTS

| | | | | |
|---|---|---|---|---|
| 10,920,584 | B2 * | 2/2021 | Erge | E21B 47/117 |
| 2013/0146359 | A1 * | 6/2013 | Koederitz | E21B 21/08 175/48 |
| 2015/0112597 | A1 | 4/2015 | Laing | |
| 2016/0369581 | A1 * | 12/2016 | Dugas | E21B 47/06 |
| 2018/0189664 | A1 * | 7/2018 | Hegde | G06N 7/01 |
| 2018/0291728 | A1 * | 10/2018 | Erge | E21B 47/10 |

(Continued)

FOREIGN PATENT DOCUMENTS

| | | | |
|---|---|---|---|
| EP | 3311001 | B1 | 7/2020 |
| WO | 2019013648 | A1 | 1/2019 |

OTHER PUBLICATIONS

Search Report and Written Opinion of International Patent Application No. PCT/US2023/069342 dated Oct. 17, 2023, 9 pages.

(Continued)

*Primary Examiner* — Catherine T. Rastovski
*Assistant Examiner* — Michael J Singletary
(74) *Attorney, Agent, or Firm* — Kyle R. Miiller

(57) ABSTRACT

A method of analyzing flowback of a downhole system includes generating active flowback data by monitoring an active flowback from a wellbore. Historic flowback data for historic flowback from the wellbore is used to determine a flowback cluster. The flowback cluster is selected based on comparing the active flowback data to the historic flowback data and determining one or more data instances of the historic flowback data that have features that are similar to that of the active flowback data. Based on the flowback cluster, one or more thresholds may be determined in order to generate an alert when the active flowback data exceeds the thresholds.

18 Claims, 10 Drawing Sheets

(56) References Cited

U.S. PATENT DOCUMENTS

2022/0325587 A1 * 10/2022 Collins ..................... G01F 1/00

OTHER PUBLICATIONS

Ali, T. H. et al., "Automated Alarms for Smart Flowback Fingerprinting and Early Kick Detection", presented at the SPE/IADC Drilling Conference held in Amsterdam, The Netherlands, 2013, 9 pages.

Mu, C. et al., "An Innovative Automatic Alarm System for Early Kick or Influx Events by a Machine Learning Based Abnormal Flowback Detection", SPE-126388-MS, presented at the ADIPEC, Abu Dhabi, USA, 2023, 7 pages.

* cited by examiner

SYSTEMS AND METHODS FOR DETECTING ABNORMAL FLOWBACK

CROSS-REFERENCE TO RELATED APPLICATIONS

This application claims priority to and the benefit of U.S. Provisional Patent Application No. 63/367,346, file on Jun. 30, 2022, which is hereby incorporated by reference in its entirety.

BACKGROUND

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be formed in earthen formations using earth-boring tools such as drill bits for drilling wellbores and reamers for enlarging the diameters of wellbores.

During downhole drilling activities, a downhole system may experience flowback, or fluids returning to the surface from the wellbore. It may be crucial to monitor flowback in order to assess the well's productivity, identify potential issues, and ensure safe and efficient drilling operations. In some situations, flowback monitoring may be difficult, inaccurate, time-consuming, delayed, and/or prone to human error and subjectivity. Thus, automated systems that may provide real-time monitoring and analysis of active flowback, as well as accurate characterization and interpretation of flowback patterns may be advantageous.

SUMMARY

In some embodiments, a method of analyzing flowback of a downhole system includes generating active flowback data by monitoring an active flowback from a wellbore and identifying historic flowback data for historic flowback from the wellbore. The method includes determining a flowback cluster based on comparing the active flowback data to the historic flowback data. The method includes generating a flowback threshold based on the flowback cluster. The method includes generating an alert based on the active flowback data exceeding the flowback threshold.

In some embodiments, a method of analyzing flowback of a downhole system includes generating active flowback data by monitoring an active flowback from a wellbore and identifying historic flowback data for historic flowback from the wellbore. The method includes determining a flowback cluster based on comparing the active flowback data to the historic flowback data. The method includes predicting the active flowback based on the flowback cluster.

In some embodiments, a system includes at least one processor, memory in electronic communication with the at least on processor, and instructions stored in the memory being executable by the at least one processor to generate active flowback data by monitoring an active flowback from a wellbore and identify historic flowback data for historic flowback from the wellbore. The memory includes instructions to determine a flowback cluster based on comparing the active flowback data to the historic flowback data. The memory includes instruction to generate a flowback threshold based on the flowback cluster. The memory includes instructions to generate an alert based on the active flowback data passing the flowback threshold.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure may be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
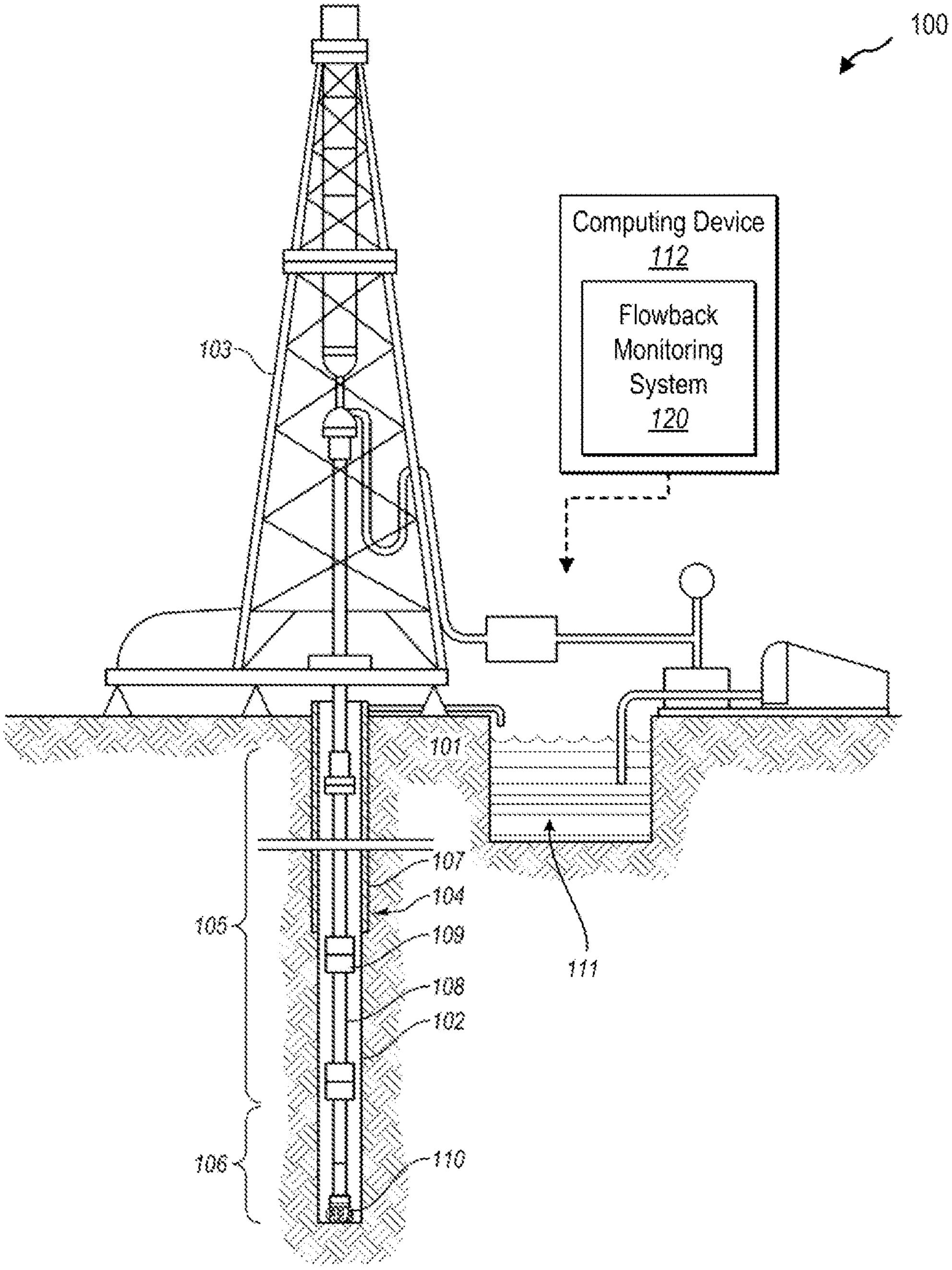
FIG. 1 is schematic view of a downhole system, according to at least one embodiment of the present disclosure.

Embodiments of the present disclosure relate to systems, methods, and computer-readable media for detecting abnormal flowback from a wellbore. In particular, the present disclosure involves monitoring several downhole parameters in connection with a pump off period, or a period when drilling fluid is not actively being pumped into the wellbore. For example, one or more prior conditions may be monitored (e.g., periodically or constantly) such as a flow rate of the drilling fluid into the wellbore, a depth of a downhole tool, a pressure of the drilling fluid, a flow pattern of the drilling fluid, etc. When the drilling fluid pump is turned off, the flowback of drilling fluid up and/or out of the wellbore may be measured, monitored, and logged, as well as the prior conditions just before, or prior to, the pump off period. Based on the prior conditions (or any other relevant measurement) an active flowback may be compared to one or more previous instances of flowback in order to characterize and interpret the flowback. For example, one or more thresholds may be established based on the historic instances of flowback in order to determine if an active flowback is higher or lower than expected. In this way, the techniques of the present disclosure may facilitate determining abnormal flowback.

As will be discussed in further detail below, the present disclosure includes a number of practical applications having features described herein that provide benefits and/or solve problems associated with monitoring and detecting abnormal flowback in a downhole system. Some example benefits are discussed herein in connection with various features and functionalities provided by a flowback monitoring system implemented on one or more computing devices. It will be appreciated that benefits explicitly discussed in connection with one or more embodiments described herein are provided by way of example and are not intended to be an exhaustive list of all possible benefits of the flowback monitoring system.

For example, flowback in downhole systems is conventionally monitored and interpreted through a combination of manual observations and data analysis, for example, by a skilled operator. In some situations, flowback monitoring may typically involve personnel visually inspecting the flowback process to look for visual cues in the drilling fluid being discharged. Additionally, on-site measurements and data logging may measure and record downhole parameters associated with flowback, and the data may be retrospectively and manually reviewed by operators to identify trends and/or compare the data with historical data and thresholds in order to detect irregularities. Thus, conventional flowback monitoring techniques may be delayed, time-consuming, prone to human error, and may lack the ability to detect abnormal flowback in real time in order to make informed, timely decisions.

In contrast, the flowback monitoring system described herein provides significant improvements over conventional methods. For example, in contrast to manual observation and periodic sampling, by leveraging real-time data analysis and continuous monitoring capabilities, the flowback monitoring system automatically collects and processes data from multiple sensors, providing a more comprehensive and accurate assessment of wellbore conditions associated with flowback. Additionally, by monitoring real-time data, the system may promptly detect abnormal flowback events in near real time, as opposed to delayed or after-the-fact detection of conventional techniques. This early detection enables operators to take timely corrective actions, which may facilitate minimizing risks, reducing downtime, and enhancing operational efficiency. Moreover, the flowback monitoring system eliminates the limitations of human error, fatigue and subjectivity associated with conventional, operator-based monitoring, ensuring consistent and reliable flowback interpretation and decision-making.

In addition to automatically monitoring flowback generally, the flowback monitoring system detects abnormal flowback and provides alerts that pertain to the abnormal flowback based on thresholds established from historic flowback data. Analyzing and comparing the historic flowback data provides valuable insight and comparison to patterns and trends of the wellbore. By comparing real-time data with automatically updated thresholds and/or determined patterns based on historic data, the flowback monitoring system may differentiate between expected variations and abnormal flowback events. By leveraging the real-time monitoring with thresholds based on historical analysis of wellbore measurements, the flowback monitoring system facilitates more informed decision-making for effective and timely flowback management.

Further, the flowback monitoring system provides improved accuracy in abnormal flowback detection by selectively comparing historical flowback data to an actively observed flowback pattern. For example, conventional methods may leverage data logging and trend analysis to implement predefined thresholds and to compare flowback data to established, historic patterns in the flowback. However, these techniques do not account for specific wellbore conditions associated with the measurements of historic and active flowbacks. By monitoring one or more prior conditions of the wellbore and associating those prior conditions with the flowback measurements, the flowback monitoring system compares an active flowback to a flowback cluster of historic flowbacks having similar prior wellbore conditions. For example, the flowback monitoring system may select one or more instances of historic flowback for the flowback cluster based on those instances having prior flow rate measurements and/or depth measurements that are within a threshold range of the measurements of the active flowback. The flowback monitoring system may generate a best fit curve that approximates the behavior of the flowback cluster. In this way, the flowback monitoring system may more accurately predict an expected behavior of the current, active flowback. Additionally, the flowback monitoring system calculates and/or generates a probabilistic distribution based on the flowback cluster in order to better characterize and interpret deviations of the active flowback from the predicted flowback behavior of the best fit curve. In this way, the flowback monitoring system may determine abnormal flowback with higher confidence.

Additional detail will now be provided regarding systems described herein in relation to illustrative figures portraying example embodiments. For example, FIG. 1 shows one example of a downhole system 100 for drilling an earth formation 101 to form a wellbore 102. The downhole system 100 includes a drill rig 103 used to turn a drilling tool assembly 104 which extends downward into the wellbore 102. The drilling tool assembly 104 may include a drill string 105, a bottomhole assembly (BHA) 106, and a bit 110 attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 further includes additional components such as subs, pup joints, etc. The drill pipe 108 provides a hydraulic passage through which drilling fluid is pumped from the surface. The drilling fluid discharges through nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between the drill string 105 and the bit 110). Examples of additional BHA components include drill collars, stabilizers, measurement-while-drilling (MWD) tools, logging-while-drilling (LWD) tools, downhole motors, underreamers, section mills, hydraulic disconnects, jars, vibration or damping tools, other components, or combinations of the foregoing. The BHA 106 may further include a rotary steerable system (RSS). The RSS may include directional drilling tools that change a direction of the bit 110, and thereby the trajectory of the wellbore 102. In some cases, at least a portion of the RSS maintains a geostationary position relative to an absolute reference frame, such as gravity, magnetic north, or true north. Using measurements obtained with the geostationary position, the RSS may locate the bit 110, change the course of the bit 110, and direct the directional drilling tools on a projected trajectory.

In general, the downhole system 100 may include additional or other drilling components and accessories, such as special valves (e.g., kelly cocks, blowout preventers, and safety valves). Additional components included in the downhole system 100 may be considered a part of the drilling tool assembly 104, the drill string 105, or a part of the BHA 106 depending on their locations in the downhole system 100.

In some embodiments, a downhole motor in the BHA 106 generates power for downhole systems and/or provides rotational energy for downhole components (e.g., rotate the bit 110). The downhole motor may be any type of downhole motor, including a positive displacement pump (such as a progressive cavity motor) or a turbine. In some embodiments, the downhole motor is powered by the drilling fluid. In other words, the drilling fluid pumped downhole from the surface may provide the energy to rotate a rotor in the downhole motor. The downhole motor may operate with an optimal pressure differential or pressure differential range. The optimal pressure differential may be the pressure differential at which the downhole motor may not stall, burn out, overspin, or otherwise be damaged. In some cases, the downhole motor drives the rotation of the bit. In some embodiments, the rotation of the bit is driven by a component at the surface of the wellbore 102.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits, and roller cone bits. In other embodiments, the bit 110 may be a mill used for removing metal, composite, elastomer, other downhole materials, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface or may be allowed to fall downhole. In still other embodiments, the bit 110 may include a reamer. For instance, an underreamer may be used in connection with a drill bit and the drill bit may bore into the formation while the underreamer enlarges the size of the bore.

As mentioned above, the downhole system 100 may include or may implement a drilling fluid or drilling mud. In some embodiments, the downhole system 100 includes a mud tank 111. The mud tank 111 may be a reservoir for holding a volume of the drilling fluid. The drilling fluid may be pumped from the mud tank 111, through one or more fluid lines, and down the drilling tool assembly 104 to the bit 110. As mentioned above, the drilling fluid may exit the drill bit, for example, at the bottom of the wellbore 102 in order to cool the bit 110 and/or to remove and carry away cuttings.

In some embodiments, the drilling fluid is implemented in this way and at least partially fills the wellbore 102. For example, the drilling fluid may be pumped through the drilling tool assembly and out the bit 110 such that the wellbore may fill up, and the drilling fluid may flow out of the annular region of the wellbore around the drill string 105. In this way, the drilling fluid may flow upward through the annular region of the wellbore 102 to carry formation cuttings and heat energy away from the bit 110. In this manner, the drilling fluid may circulate from the mud tank 111, down through the drilling tool assembly 104, back up the wellbore 102, and back to the mud tank 111.

During drilling operations, it may periodically be necessary to stop or pause pumping of the drilling fluid into the wellbore 102. For example, additional lengths of drill pipe 108 may periodically be added to the drilling tool assembly 104 as the bit 110 advances downward through the earth formation 101, and the pumps supplying the drilling fluid to the drilling tool assembly 104 may be turned off. In many situations, a volume of fluid (e.g., drilling fluid and/or formation fluid) may flow back up and/or out of the wellbore 102 (e.g., the annular region) during the pump off period. For example, pumping the drilling fluid into the wellbore 102 may create a pressure imbalance in the wellbore which may counterbalance formation pressures and influxes of formation fluids such as oil, gas, or water. Turning the pump off may release the pressure imbalance, and the formation pressures may cause the drilling fluid and/or formation fluids to flow up and out of the wellbore 102. Additionally, in many cases natural gas may become dissolved in the drilling fluid, and when the pressure of the drilling fluid is released, the natural gas may expand, leading to an increase in volume and a flow of the drilling fluid up and out of the wellbore 102. The flow of fluid up and out of the wellbore may be caused by a variety of other means.

This flow of fluid out of the wellbore 102 after the pump(s) is turned off is known as flowback. Efforts may typically be made to control, predict, and/or expect certain volumes of flowback as well as to safely recover and handle the fluids. In some embodiments, an excess volume of flowback (e.g., higher than expected) is indicative of a well or formation kick, or the influx or flow of formation fluids into the wellbore from the formation. Detecting and responding to formation kicks may be crucial for maintaining well control and preventing more severe incidents such as blowouts, thus ensuring safe operation of the downhole system 100. In some embodiments, a reduced volume of flowback (e.g., lower than expected) is indicative of formation loss, or a (e.g., unexpected) loss of drilling fluid into the formation. Detecting and responding to formation loss may be crucial for maintaining well integrity, preventing damage to the surrounding formation, and maintaining sufficient hydrostatic pressure in the wellbore 102 to control the well and prevent formation influxes. Thus, the interpretation and analysis of flowback patterns, known as flowback fingerprinting, may provide advantageous information for the efficient operation of the downhole system 100.

In some situations, however, it may be difficult to adequately and/or accurately characterize and/or interpret the flowback patterns observed in a downhole system 100. For example, many factors may affect how much and to what extent flowback occurs after pump shut off. Accordingly, it may be difficult to accurately characterize and/or predict an expected amount of flowback in order to determine an excess or reduced amount of flowback during any given pump off period. Thus, improved systems and methods for detecting abnormal flowback may be beneficial over conventional techniques.

In some embodiments, the downhole system 100 includes a computing device 112. The computing device 112 may refer to a variety of computing devices including a mobile device such as a mobile telephone, smartphone, a laptop, or other mobile device. The computing devices 112 may refer to non-mobile devices such as a desktop computer, a server device, or other non-portable devices. The computing device 112 may be a surface computing device, a mobile computing device, a remote computing device, a downhole computing device, and combinations thereof. The computing device 112 may be in electronic communication with one or more components of the downhole system 100 such as sensors, electronic components, and other computing devices.

In some embodiments, the computing device includes a flowback monitoring system 120 implemented thereon. As will be discussed in further detail below, the flowback monitoring system 120 may facilitate monitoring, analyzing, and/or interpreting the flowback experienced by the downhole system 100, for example, during one or more pump off periods. In this way, the flowback monitoring system 120 may facilitate a more accurate understanding and characterizing of one or more downhole conditions based on an observed flowback.

Figure 2:
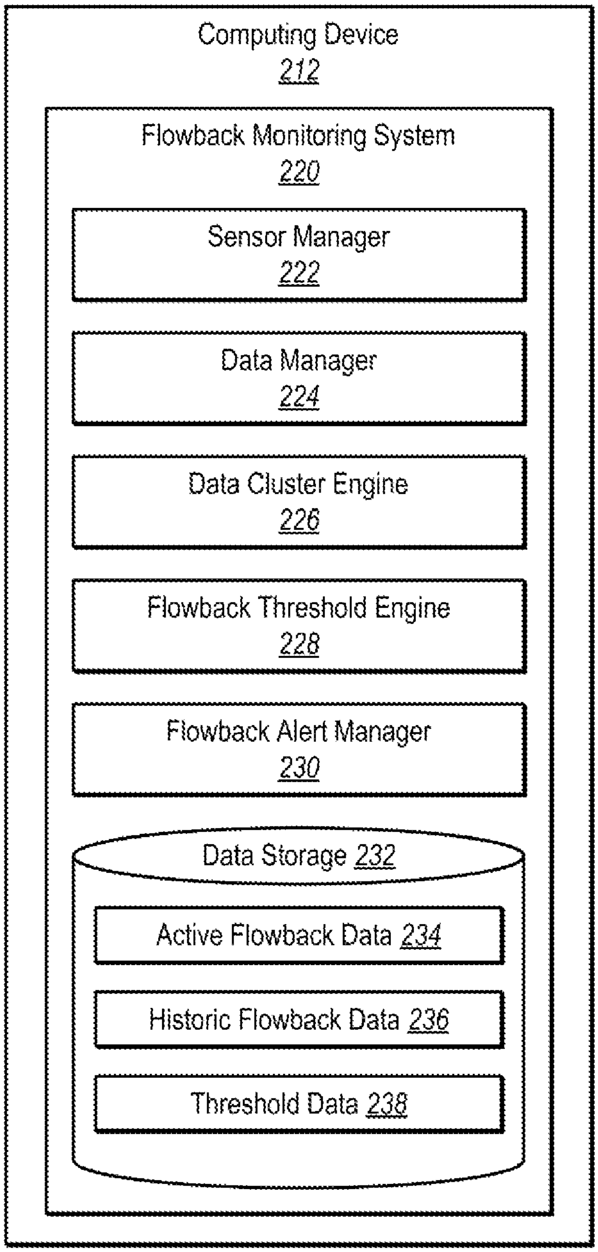
FIG. 2 illustrates an example computing device having a flowback monitoring system implemented thereon, according to at least one embodiment of the present disclosure.

FIG. 2 shows an example computing device 212 with a flowback monitoring system 220 implemented thereon, according to at least one embodiment of the present disclosure. The flowback monitoring system 220 may include a sensor manager 222, a data manager 224, a data cluster engine 226, a flowback threshold engine 228, and a flowback alert manager 230. Additionally, the flowback monitoring system 220 may include a data storage 232 including active flowback data 234, historic flowback data 236, and threshold data 238. While one or more embodiments described herein describe features and functionalities performed by specific components 222-230 of the flowback monitoring system 220, it will be appreciated that specific features described in connection with one or more components of the flowback monitoring system 220 may, in some examples, be performed by one or more of the other components of the flowback monitoring system 220.

By way of example, as will be discussed below, one or more features of the data manager 224 may be delegated to other components of the flowback monitoring system 220. As another example, one or more instances of data may be selected and/or processed by the data cluster engine 226, and in some instances, some or all of these features may be performed by the flowback threshold engine 228 (or other component(s) of the flowback monitoring system 220). Indeed, it will be appreciated that some or all of the specific components may be combined into other components and specific functions may be performed by one or across multiple components 222-230 of the flowback monitoring system 220.

As just mentioned, the flowback monitoring system 220 includes a sensor manager 222. The sensor manager 222 may be in data communication with one or more sensors and may monitor and/or manage the measurements and/or signals received from the sensors. In this way, the sensor manager 222 may measure and/or monitor one or more parameters of the downhole system.

Figure 3:
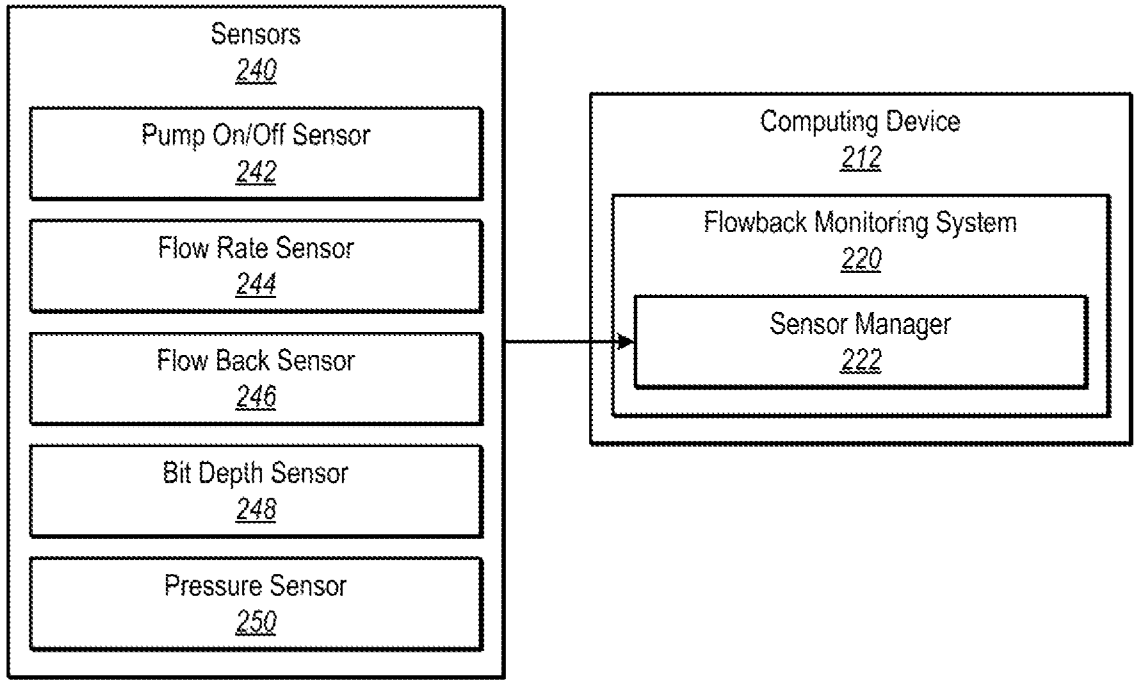
FIG. 3 illustrates a computing device having the flowback monitoring system of FIG. 2 implemented thereon.

As shown in FIG. 3, the flowback monitoring system 220 may be connected to and/or may be in communication with sensors 240. The sensors 240 may include one or more sensors implemented in or in connection with, the downhole system. In some embodiments, the sensors 240 include a pump on/off sensor 242. As discussed above, the downhole system may pump drilling fluid down into the wellbore via the drilling tool assembly. In some situations, the pump may be turned off, such as to add or replace one or more sections of drill pipe, or to stop, adjust, or change an operation of the downhole system. The pump on/off sensor 242 may monitor the state of the pump and may transmit the pump state or condition to the sensor manager 222. In this way, the flowback monitoring system 220 may monitor a present operational state of the pump, for example, in order to detect a pump off period.

In some embodiments, the sensors 240 include a flow rate sensor 244. The flow rate sensor 244 may measure or detect a flow rate of the drilling fluid supplied to the wellbore. For example, the flow rate sensor 244 may measure the flow rate of the drilling fluid into the drilling tool assembly. The flow rate sensor 244 may measure or detect the flow rate of the drilling fluid, for example, at the surface of the wellbore. The flow rate sensor 244 may measure the flow rate of the drilling fluid at the pump. The flow rate sensor 244 may measure the flow rate of the drilling fluid at one or more locations in the drilling tool assembly, such as at the bit. As will be discussed in further detail below, the flow rate prior to a pump off period may be a prior condition associated with determining an abnormal flowback during the pump off period. Thus, measuring the flow rate in this way may facilitate characterizing an observed or active flowback. For this purpose, in some embodiments, the flow rate sensor 244 constantly monitors the flow rate such that a prior flow rate is determined when a pump off period is identified. In some embodiments, the flow rate sensor 244 periodically measures the flow rate, or is activated to measure the flow rate prior to the pump being turned off. In this way the flowback monitoring system 220 may monitor and/or measure a flow rate of drilling fluid supplied to the wellbore prior to a pump off period.

In some embodiments, the sensors 240 include a flowback sensor 246. The flowback sensor 246 may measure a flow of fluid (e.g., drilling fluid and/or formation fluid) that flows from or out of the wellbore, (e.g., a flowback volume from the wellbore). The flowback sensor 246 may measure a pattern of the flowback such as a rate and/or a total volume of fluid flowing from the wellbore. The flowback sensor 246 may measure a rate and/or a total volume of fluid flowing into the mud tank and/or may measure a level or amount (e.g., an active volume) of fluid in the mud tank. In some embodiments, the flowback sensor 246 constantly monitors the flowback, for example, during some or all of a drilling operation. In some embodiments, the flowback sensor 246 periodically monitors the flowback during an some or all of a drilling operation. In some embodiments, the flowback sensor 246 is activated during a pump off period such that the flowback sensor 246 only monitors and/or measures the flowback while the pump is turned off. In this way, the flowback monitoring system 220 may monitor and/or measure the flowback of fluid from or out of the wellbore.

In some embodiments, one or more of the flow rate sensor 244 and the flowback sensor 246, either singly or in combination, monitors and/or measures (or facilitates monitoring and/or measuring) a flow pattern of the drilling fluid. For example, the movement and distribution of the drilling fluid within the wellbore may vary based on factors such as drilling techniques, wellbore conditions, drilling fluid properties, etc. As such, the sensor manager 222 may monitor and/or measure the flow pattern in order to facilitate characterizing the flowback, as described herein.

In some embodiments, the sensors 240 include a bit depth sensor 248. The bit depth sensor 248 may monitor and/or measure the depth of one or more components of the downhole system, such as one or more downhole tools. For example, the bit depth sensor 248 may measure the depth of a bit being used to lengthen and/or widen the wellbore. The measurement of the bit depth sensor 248 may be taken in connection with a pump off period. For example, the depth of a downhole tool may be relevant to interpreting an associated flowback (e.g., measured at or near the surface), and the depth of the downhole tool may be measured prior to and/or during an associated pump off period. In this way, the flowback monitoring system 220 may monitor one or more depths associated with a downhole operation.

In some embodiments, the sensors 240 include a pressure sensor 250. The pressure sensor 250 may measure a fluid pressure of the drilling fluid at one or more locations of the downhole system. For example, the pressure sensor 250 may measure the drilling fluid pressure at the pump, at the standpipe, at one or more locations in the drilling tool assembly, at the bit, at one or more locations in the wellbore (e.g., the annular region), and combinations thereof. The pressure sensor 250 may measure the drilling fluid pressure constantly, periodically, and/or may be triggered or activated corresponding with a pump off period (e.g., to measure the pressure prior to the pump off period). In this way, the flowback monitoring system 220 may monitor the drilling fluid pressure at one or more locations in the downhole system.

It should be understood that the downhole system and the flowback monitoring system 220 are not limited to including those sensors shown and discussed in connection with FIG. 3, but that the sensors may include any other sensor (or may omit one or more sensors) and/or the sensor manager 222 may be connected to and/or in communication with one or more sensors in addition to that discussed herein. Indeed, the sensors 240 may include any sensor for monitoring and/or taking measurements of one or more parameters (e.g., prior conditions) relevant to monitoring, measuring, and/or characterizing flowback as described herein. Additionally, the various sensors described herein may be implemented as one or more physical sensing devices, as one or more computations based on signals from physical sensing devices, and combinations thereof. For example, the pump on/off sensor may be a physical sensor that detects the active state of a pump, or may be a computation based on another signal that the pump is on or off, such as the flow rate sensor. In this way, the term sensor should be understood to encompass a device for the physical sensing of a condition or measurement, as well as a software implementation for a computation associated with a condition or measurement (and combinations thereof).

As mentioned above, and as shown in FIG. 2, the flowback monitoring system 220 may include a data manager 224. The data manager 224 may receive data or information (e.g., from the sensor manager 222) corresponding to one or more sensor measurements. The data manager 224 may save and/or store the sensor measurements to the data storage 232 (e.g., as active flowback data 234 and/or historic flowback data 236 as discussed below). In some embodiments, the data manager 224 associates one or more types and/or instances of the sensor measurements with each other. For example, the data manager 224 may receive flowback measurements and may map or associate the flowback measurements with flow rate measurements, flow pattern measurements, depth measurements, pressure measurements, any other measurements taken by and/or accessible to the data manager 224, and combinations thereof. In accordance with at least one embodiment of the present disclosure, the data manager 224 associates the flowback measurements with the (e.g., prior) flow rate measurements.

In some embodiments, the data manager 224 receives the pump on/off measurements from the sensor manager 222 corresponding with a pump on or off period. The data manager 224 may save and/or store one or more of the sensor measurements based on receiving an indication of a pump off period. The data manager 224 may associate or map two or more measurements and/or instances of the sensor measurements based on receiving an indication of a pump off period.

In some embodiments, at least some of the sensor measurements are associated with a prior condition of the downhole system and/or wellbore. For example, the sensor manager 222 may monitor and/or measure one or more aspects of the downhole system prior to a pump off period. Upon receiving an indication of a pump off period, the data manager 224 may save and/or store one or more measurements and/or instances of the sensor measurements prior to the pump off period as a prior condition of the wellbore associated with the pump off period. For example, the data manager 224 may receive a pump off indication, and may recall the flow rate, pressure, depth, flow pattern, or any other measurement (and combinations thereof), and may save these measurements as a prior condition of the pump off period. The prior condition(s) may be one or more measurements taken within (e.g., prior to) 10 seconds, 30 seconds, 1 minute, 2 minutes, 4 minutes, 5 minutes, or 10 minutes (or any values therebetween) of the beginning of a pump off period. In some embodiments it is critical that each prior condition be a measurement taken within 2 minutes of the initiation of the pump off period in order that the measurement of the prior condition accurately reflect the state and/or behavior of the well associated with the flowback measurements taken during the pump off period (e.g., taken after the prior condition). Each prior condition may be calculated or associated with an average, minimum, maximum, mean, median, mode, range, or any other value or range of values of the prior condition measurements. In this way, the flowback measurements taken during a pump off period may be associated with one or more prior conditions indicative of observable well conditions at the time the pump is turned off.

In some embodiments, saving the prior condition(s) is associated with monitoring and/or measuring and/or storing the (e.g., active) flowback measurements after the indication of the initialization of a pump off period. In this way, the flowback measurements may be captured, for example, during a pump off period, and one or more prior conditions of the downhole system and/or wellbore may be saved and/or associated with the measurement of the active (e.g., pump-off) flowback. As will be discussed below, mapping and/or associating the flowback to the prior conditions of the wellbore may facilitate characterizing and/or interpreting the flowback measurements.

As mentioned above, the data storage 232 may include active flowback data 234 and historic flowback data 236. In some embodiments, the data manager 224 receives the sensor measurements and stores them as active flowback data 234. For example, the sensor manager 222 may receive a pump off indication and may begin recording and/or saving the flowback measurements as active flowback data 234, corresponding to an active flowback of the downhole system. The data manager 224 may recall and save the prior conditions associated with the active flowback and/or the active pump off period as (e.g., part of) the active flowback data 234. In this way, the active flowback data 234 may include flowback measurements and prior conditions associated with and/or based on an active pump off period of the downhole system.

In some embodiments, the data manager 224 stores and/or caches some or all of the active flowback data 234 as historic flowback data 236. The data manager 224 may cache the active flowback data 234 based on one or more trigger conditions, such as a period of time elapsing after a pump has turned off, a pump turning back on, and/or a flowback stopping or becoming identified as stable (e.g., not abnormal). For example, the data manager 224 may record and/or store the active flowback data 234 during some or all of an active pump off period. Based on receiving an indication of the pump turning back on (e.g., the active pump off period ending) the data manager 224 may migrate the active flowback data 234 for the (now past) pump off period and save the data as historic flowback data 236. In some embodiments, the data manager 224 may clear the active flowback data 234 in preparation for measuring and/or storing (e.g., new) active flowback data corresponding with a next pump off period. The data manager 224 may begin recording and/or storing additional (e.g., new) sensor measurements as the active flowback data 234. In this way the active flowback data 234 may include and/or may be associated with measurements corresponding to only an active (or upcoming) pump off period, and the historic flowback data 236 may include measurements associated with one or more previous pump off periods (e.g., previous instances of active flowback data 234). In this way, as discussed below, the active flowback data 234 may be compared to the historic flowback data 236 in order to facilitate accurately characterizing and interpreting an active flowback of the downhole system.

In some embodiments, the data manager 224 clears or deletes one or more data instances from the data storage 232. For example, in some situations it may be determined that the historic flowback data 236 is less relevant and/or valuable for comparison with the active flowback data 234 when it does not occur and/or is not measured within a certain time frame. Accordingly, the data manager 224 may clear or delete one or more instances of the historic flowback data 236 based on the instances having a threshold age or occurring before a threshold time interval. In some embodiments, the data manager 224 clears data instances from the historic flowback data 236 that are more than 1 hour, 2 hours 3 hours, 4 hours, 5 hours, 6 hours, 7 hours, 8 hours, 9 hours, or 10 hours (or any value therebetween) old (e.g., that occur more than that much time prior to the active flowback data 234 and/or an active pump off period). In another example, in some situations it may be determined that the historic flowback data 236 is less relevant and/or valuable for comparison with the active flowback data 234 when it does not occur during a same downhole operation, type of downhole operation, or run of a downhole tool. Accordingly, the data manager 224 may clear or delete some or all of the historic flowback data 236 based on a downhole tool being tripped from the wellbore, and/or based on a change in a downhole operation or type of downhole operation. In this way, the data manager 224 may maintain the data in the data storage 232 such that the historic flowback data 236 is most relevant, useful, and/or valuable for facilitating the characterization and/or interpretation of an active flowback.

As mentioned above, and as shown in FIG. 2, the flowback monitoring system 220 may include a data cluster engine 226. The data cluster engine 226 may sort, index, filter and/or select one or more instances of the historic flowback data 236 in the data storage 232. For example, the data cluster engine 226 may select a flowback cluster, or one or more instances of the historic flowback data 236 (e.g., corresponding to one or more previous pump off periods) and may save or store the flowback cluster to the data storage 232 as threshold data 238. The flowback cluster and the threshold data 238 may facilitate comparing one or more previously observed flowbacks of the wellbore for use in comparing with an active flowback (e.g., comparing with the active flowback data 234) in order to characterize and/or interpret the flowback.

In some embodiments, the data cluster engine 226 automatically selects the flowback cluster based on the pump on/off period. For example, the data cluster engine 226 may receive an indication that the pump has turned off, and may automatically sort, filter, and/or select one or more instances of the historic flowback data 236 as the flowback cluster and may store the flowback cluster to the data storage 232 as threshold data 238. The data cluster engine 226 may select the flowback cluster at any other time or based on any other trigger.

In some embodiments, the data cluster engine 226 filters and/or sorts the historic flowback data 236 and may clear, delete, flag, and/or isolate one or more instances of the historic flowback data 236 (and/or active flowback data) from the data storage 232. The data cluster engine 226 may flag, filter, or clear data instances based on a data quality of the data. For example, in some situations one or more measurements and/or data instances may be or may become corrupted, incomplete, disjointed, unclear or otherwise be of poor quality. In some situations, the data cluster engine identifies one or more measurements and/or data instances as inaccurate, uncalibrated, unexpected, or as an outlier. These sensor and/or data and/or measurement errors may be a result of a sensor malfunctioning, becoming disconnected or damaged, or any other reason. The data cluster engine may accordingly flag, separate, filter, and/or delete some or all of one or more measurements and/or data instances of the historic flowback data 236 and/or the active flowback data 234. In this way, the data cluster engine 226 may maintain a quality of the measurement and/or data of the flowback monitoring system 220.

The data cluster engine 226 may select the flowback cluster based on the data instances being well suited for evaluating an active flowback and/or being more relevant to the characterization of the active flowback. For example, one or more instances of the historic flowback data 236 may be relevant and/or useful for comparison with the active flowback data 234 when the data instances have one or more similar features to that of the active flowback data 234.

Figure 4:
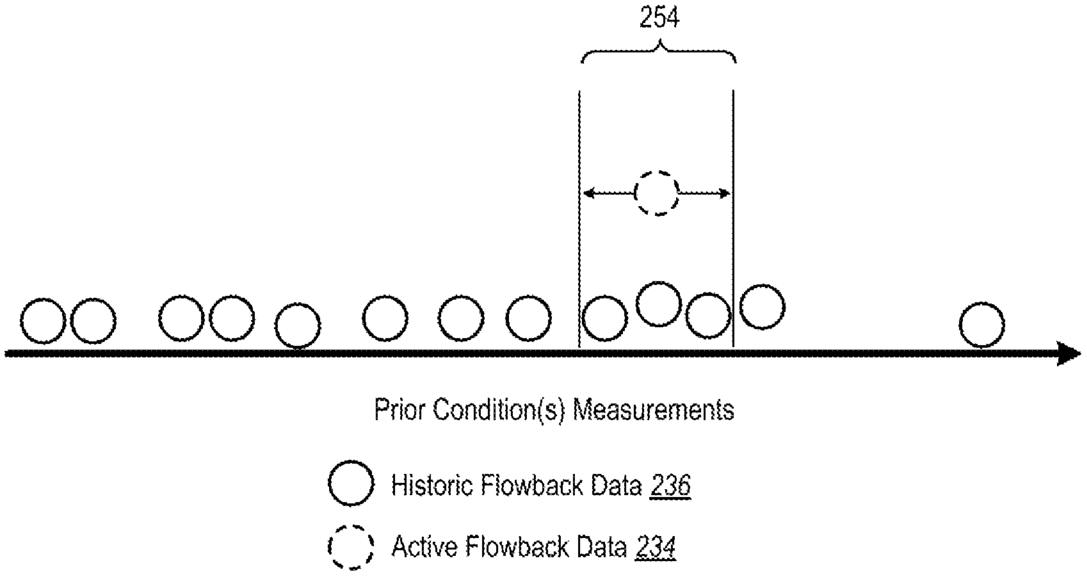
FIG. 4 illustrates an example implementation of determining a flowback data cluster, according to at least one embodiment of the present disclosure.

In some embodiments, the flowback cluster is automatically selected based on one or more of the prior conditions associated with the active flowback data 234 and the historic flowback data 236. For example, as shown in the illustration in FIG. 4, the data cluster engine 226 may sort, rank, categorize, list, or otherwise organize the historic flowback data 236 based on one or more of the prior conditions associated with the historic flowback data 236. In accordance with at least one embodiment of the present disclosure, the data cluster engine 226 organizes the historic flowback data 236 based on the prior flow rate measurements associated with the historic flowback data 236 (e.g., the flow rate prior to each pump off period associated with each data instance). The data cluster engine 226 may organize the historic flowback data 236 based on the pressure measurements, depth measurements, flow pattern measurements, any other measurements, and combinations thereof.

After sorting the historic flowback data 236, the data cluster engine 226 may select one or more data instances of the historic flowback data 236 as the flowback cluster 254. For example, the data cluster engine 226 may select 1, 2, 3, 4, 5, 6, 7, 8, 9, or 10 (or any value therebetween) data instances of the historic flowback data 236 to comprise the flowback cluster 254. In some embodiments, it is critical that the flowback cluster 254 comprise three data instances of the historic flowback data 236 in order that the flowback threshold and/or envelope (as discussed below) is not too narrow or too wide. This may facilitate properly and accurately characterizing the active flowback and preventing false positive and false negative alerts resulting from improperly calculated and/or sized thresholds.

The data cluster engine 226 may select the flowback cluster 254 based on a similarity of the prior condition(s) of the historic flowback data 236 with the prior condition(s) of the active flowback data 234. For example, the flowback cluster 254 may be selected based on the data instances having a prior flow rate within a predefined range compared to the active flowback data 234. The flowback cluster 254 may be selected based on the prior flow rate of the data instances being with a range of 10, 20, 40, 50, 100, 150, or 200 gal/min (or any value therebetween) of the prior flow rate of the active flowback data 234. For example, the data cluster engine 226 may select all of the data instances falling within the given range or may select a specific quantity of data instances that are closest to the flow rate of the active flowback data 234 (e.g., while also in the given range). In some embodiments, it is critical that the flow rate(s) of the flowback cluster 254 be within a range of 50 gal/min of the active flowback data 234 to ensure that the flowback cluster 254 is sufficiently representative of the wellbore conditions of the active flowback data 234.

In another example, the flowback cluster 254 may be selected based on the data instances having a similar or close depth to the active flowback data 234 (e.g., a depth of a downhole tool prior to and/or during the corresponding pump off period). The flowback cluster 254 may be selected based on the depth of the data instances being within a range of 25 m, 50 m, 100 m, 150 m, 200 m, 250 m, 300 m, 400 m, or 500 m, (or any value therebetween) of the depth of the active flowback data 234. For example, the data cluster engine 226 may select all of the data instances falling within the given range or may select a specific quantity of data instances that are closest to the depth of the active flowback data 234. In some embodiments, it is critical that the depth(s) of the flowback cluster 254 be within a range of 200 m of the active flowback data 234 to ensure that the flowback cluster 254 is sufficiently representative of the wellbore conditions at or near the depth of a downhole tool during the active pump off period of the active flowback data 234. The data cluster engine 226 may select the flowback cluster 254 based on similarity of any other measurements of prior conditions of the historic flowback data 236 to that of the active flowback data 234.

In some embodiments, the data cluster engine 226 selects the flowback cluster 254 based on two or more prior conditions. For example, the flowback cluster 254 may be selected based on one or more instances of the historic flowback data 236 having similar (e.g., close) flow rates and depth to that of the active flowback data 234. In another example, the flowback cluster 254 may be selected based on one or more instances of the historic flowback data 236 having similar (e.g., close) pressure and depth to that of the active flowback data 234. The flowback cluster 254 may be selected based on one or more instances of the historic flowback data 236 having any other combination of similar prior conditions and/or measurements.

In some embodiments, the data cluster engine 226 determines that one or more (or all) of the data instances of the historic flowback data 236 do not have a prior condition (of the various prior conditions) that are sufficiently similar or close to that of the active flowback data 234. The data cluster engine 226 may accordingly not select one or more data instances for the flowback cluster 254 based on that prior condition, and may proceed to compare and/or select one or more data instances for the flowback cluster 254 based on another prior condition or another measurement. In some embodiments, this selective process is based on a hierarchy or order of relevance of the prior conditions and/or other measurements to the characterization of the active flowback.

For example, the data cluster engine 226 may sort the historic flowback data 236 based on a first prior condition, such as flow rate, and may determine that none (or not enough) of the historic flowback data 236 has a prior flow rate within a threshold of the prior flow rate of the active flowback data 234. The data cluster engine 226 may accordingly not select one or more data instances for the flowback cluster 254 based on the flow rate and may proceed to sort the historic flowback data 236 based on a second prior condition, such as depth. The data cluster engine 226 may select one or more data instances for the flowback cluster 254 based on depth measurements of a downhole tool taken or measured at similar depths to the active flowback data 234. This process may proceed through any number of prior conditions and/or measurements until the data cluster engine 226 selects a flowback cluster 254 based on a sufficient similarity to the active flowback data 234.

In some embodiments, the data cluster engine 226 selects one or more data instances for the flowback cluster 254 based on a first prior condition or measurement, and may further refine and/or filter the selected data instances based on a second prior condition or measurement by adding and/or removing one or more data instances to the flowback cluster 254.

In this way, the data cluster engine 226 may determine the flowback cluster 254 by selecting one or more data instances of the historic flowback data 236 based on the data instances having one or more similar features to that of the active flowback data 234. In this way, defining a flowback cluster 254 of the historic flowback data 236 based on similarities to the active flowback data 234 may help to more accurately characterize and/or interpret the active flowback data 234.

In some embodiments, the data cluster engine 226 determines that an insufficient amount (or none) of the data instances of the historic flowback data 236 have sufficient similarity to the active flowback data 234 based on one or more prior conditions, other measurements, or any other basis. The data cluster engine 226 may accordingly not select and/or not define a flowback cluster 254. In some embodiments, the data cluster engine 226 indicates to the flowback monitoring system 220 that a flowback cluster 254 was not defined, for example, such that thresholding and/or alerting may not be performed.

As mentioned above, and as shown in FIG. 2, the flowback monitoring system 220 may include a flowback threshold engine 228. The flowback threshold engine 228 may access and/or process some or all of the data in the data storage 232 in order to predict a value, rate, and/or behavior of an active flowback.

In some embodiments, the flowback threshold engine 228 generates or fits a curve to one or more instances of the historic flowback data 236. For example, based on the flowback cluster, the flowback threshold engine 228 may generate a best fit curve representative of the flowback cluster. In some embodiments, the flowback threshold engine 228 generates a best fit curve for each of the data instances of the data cluster. In some embodiments, the flowback threshold engine 228 generates a best fit curve for all of the data instances of the flowback cluster. The best fit curve may be generated using any curve fitting technique, such as linear, polynomial, logarithmic, trigonometric, power, exponential, moving average, or any other curve fitting technique (and combinations thereof). The flowback threshold engine 228 may save or store the best fit curve to the data storage 232 as (or as part of) threshold data 238.

In accordance with at least one embodiment of the present disclosure, the best fit curve may be generated based on a hyperbolic tangent function. For example, the best fit curve may be fit based on the formula:

$$y = A * \tanh(Bx) = A * \frac{e^{2Bx} - 1}{e^{2Bx} + 1}$$

One or more embodiments may change, augment, and/or simplify this example formula or one or more parts of this example formula. In some embodiments, a best fit curve based on a hyperbolic tangent function (such as that shown above) approximates the general shape of the flowback measurements for flowback typically observed flowing from a wellbore. For example, adjusting the variable A may adjust a slope of the curve, and adjusting the variable B may adjust an asymptote of the curve. In this way the best fit curve may be fit to one or more data instances of the flowback cluster such that the best fit curve approximates a trend of the flowback cluster.

Figure 5:
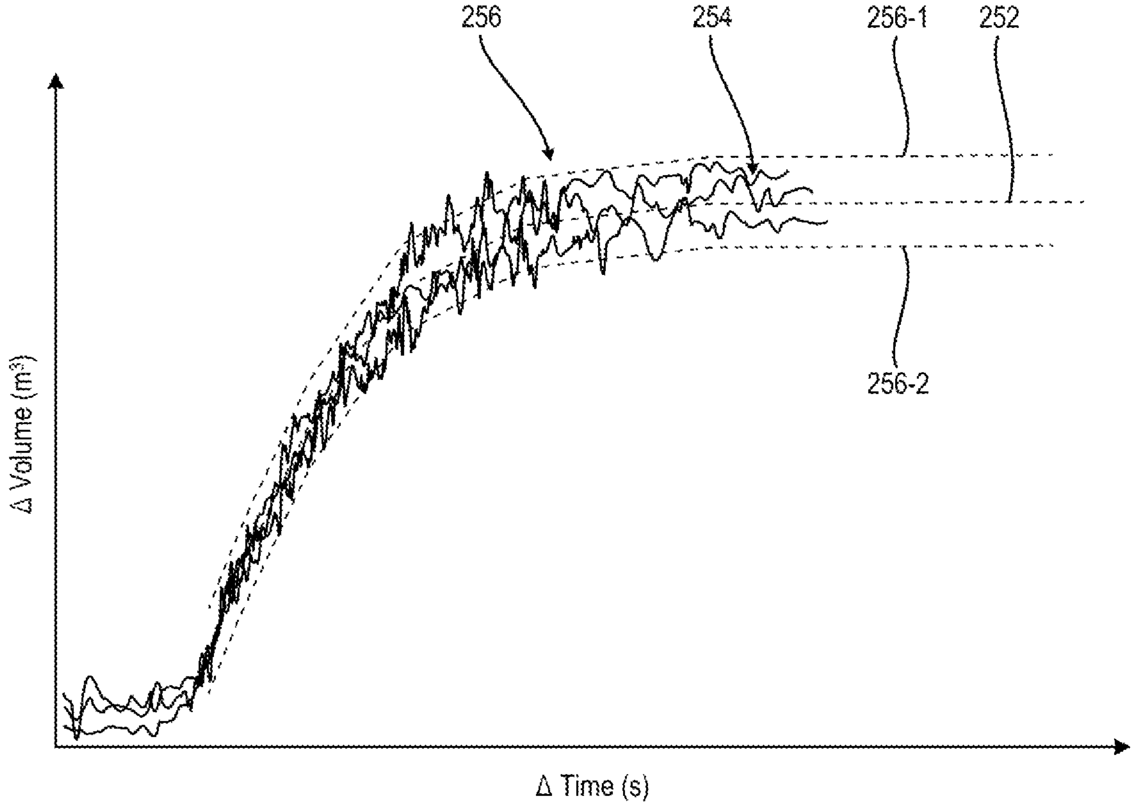
FIG. 5 illustrates a best fit curve and one or more thresholds, according to at least one embodiment of the present disclosure.

In accordance with at least one embodiment of the present disclosure, as shown in FIG. 5, the flowback threshold engine 228 may generate a best fit curve 252 for the flowback cluster 254 (e.g., a curve that is a best fit for all of the data instances of the flowback cluster). The best fit curve 252 may approximate the behavior of all of the data instances of the flowback cluster 254. As discussed above, the flowback cluster may be determined or selected based on historic data instances with similar features (e.g., prior conditions) to that of an active flowback being actively observed. In this way, the best fit curve 252 may approximate and/or predict the behavior of the active flowback and/or the best fit curve 252 may represent a curve or a set of values that the active flowback is expected to follow. For example, upon detecting a pump-off period, the data cluster engine 226 may (e.g., automatically) select the flowback cluster 254 and the flowback threshold engine 228 may (e.g., automatically) generate the best fit curve 252 for the flowback cluster 254. In this way, the behavior of the active flowback may be (e.g., automatically) predicted once the pump off period is detected.

In some embodiments, the flowback threshold engine 228 determines and/or generates a probabilistic distribution of the flowback cluster 254. The flowback threshold engine 228 may determine a probabilistic distribution of the flowback cluster 254 against, and/or over, and/or fitted to the best fit curve 252. For example, for one or more (or all) points or increments in the domain (e.g., time), the flowback threshold engine 228 may determine a probabilistic distribution of the flowback cluster 254 (e.g., over the best fit curve 252) at the corresponding domain point or (e.g., time) increment. In some embodiments, the probabilistic distribution is a Gaussian or normal probability distribution. In some embodiments, the probabilistic distribution is a Bayesian probability distribution. The probabilistic distribution may be any probabilistic distribution and/or may be based on any form or statistical theory such as discrete, continuous, binomial, Poisson, Bernoulli, hypergeometric, normal, uniform, exponential, chi-squared, logistic, student's T, any other distributions, and combinations thereof. The flowback threshold engine 228 may save or store the probabilistic distribution to the data storage 232 as threshold data 238.

In some embodiments, the probabilistic distribution incorporates and/or may be based on or against the best fit curve 252. For example, the probabilistic distribution may be generated such that the best fit curve 252 is and/or represents one or more of a mean, median, mode, average, quartile, variance, standard deviation, any other probabilistic or statistical value, and combinations thereof. In this way, the best fit curve 252 may predict an expected, ideal, or smooth behavior of the active flowback, and the probabilistic distribution may facilitate defining and/or characterizing any departure or divergence of the observed, active flowback from the prediction of the best fit curve 252.

In some embodiments, the flowback threshold engine 228 determines and/or generates a flowback threshold 256. The flowback threshold engine 228 may generate the flowback threshold 256 based at least in part on the best fit curve 252 and/or the probabilistic distribution. For example, the probabilistic distribution may define a probability that a given flowback measurement occurs at its measured value out of a range of all possible values for a given time interval. The flowback threshold 256 may be generated based on encompassing, capturing, and/or limiting a percentage of all possible values for each measurement at each time interval within a threshold probability or percentage (e.g., centered on the prediction). The flowback threshold engine 228 may save or store the flowback threshold 256 to the data storage 232 as threshold data 238.

In this way, the flowback threshold engine 228 may generate one or more flowback thresholds 256 which may indicate a value or range of values of flowback measurements at a threshold probability or percentage of departure from an expected value (e.g., best fit curve) for the flowback measurements. For example, the flowback threshold(s) 256 may represent an amount or degree of acceptable and/or safe departure for a measured active flowback from the best fit curve 252 and an active flowback measurement passing or exceeding one or more of the flowback thresholds 256 may indicate an active flowback that is excessive and/or undesirable. In accordance with at least one embodiment of the present disclosure, the flowback threshold 256 is based on one or more standard deviations of the probabilistic distribution. For example, the flowback threshold 256 may capture or encompass all possible flowback measurement values within 1, 2, or three standard deviations from the best fit curve 252, or any value therebetween (and combinations thereof). In some embodiments it is critical that the flowback threshold 256 encompasses three standard deviations above and/or below the best fit curve 252 in order to facilitate characterizing a flowback measurement outside of the flowback threshold 256 as abnormal with a sufficiently high confidence. For example, the flowback threshold 256 may include an upper bound 256-1 that is three standard deviations above the best fit curve 252, and a lower bound 256-2 that is three standard deviations below the best fit curve 252. In this way, the best fit curve 252 and/or the probabilistic distribution may facilitate characterizing and/or interpreting a departure or divergence of a measured (e.g., active)

flowback from an expected or predicted range of values based on the best fit curve 252.

As discussed above, in some embodiments, the flowback cluster 254 is not generated and/or selected, such as due to a lack of suitable data instance of the historic flowback data. In some embodiments, the flowback threshold engine 228 does not generate one or more of the best fit curve 252, the probabilistic distribution, and one or more flowback thresholds 256. Not generating one or more of these features may help to eliminate false positive and/or false negative indications of abnormal and/or undesirable flowback (as discussed below) that may occur by generating predictions and/or thresholds based on insufficient and/or inadequate historical data.

In some embodiments, the flowback threshold engine 228 generates one or more of the best fit curve 252, the probabilistic distribution, and one or more flowback thresholds 256 based on data other than the flowback cluster 254. (e.g., in situations where the flowback cluster 254 has not been selected). For example, the flowback threshold engine 228 may generate one or more of these features based on all of the historic data. In another example, the flowback threshold engine 228 may generate one or more of these features based on one or more data instances of the historic data that has features closest or most similar to that of the active flowback data. For instance, there may not be enough (or any) data instances that are sufficiently within the predefined thresholds for selecting the flowback cluster 254, and the flowback threshold engine 228 may select and use one or more of the next closest data instances (based on one or more prior condition measurements) for generating one or more of these features. In this way, the flowback threshold engine 228 may provide at least some indication of an expectation or prediction for the active flowback, for example, in situations where a flowback prediction according to the more specific and/or improved techniques described herein may not be possible.

As mentioned above, and as shown in FIG. 2, the flowback monitoring system 220 may include a flowback alert manager 230. The flowback alert manager 230 may access and/or process some or all of the data in the data storage 232 (e.g., the threshold data 238) in order to detect an abnormal active flowback and generate one or more alarms or alerts.

Figure 6:
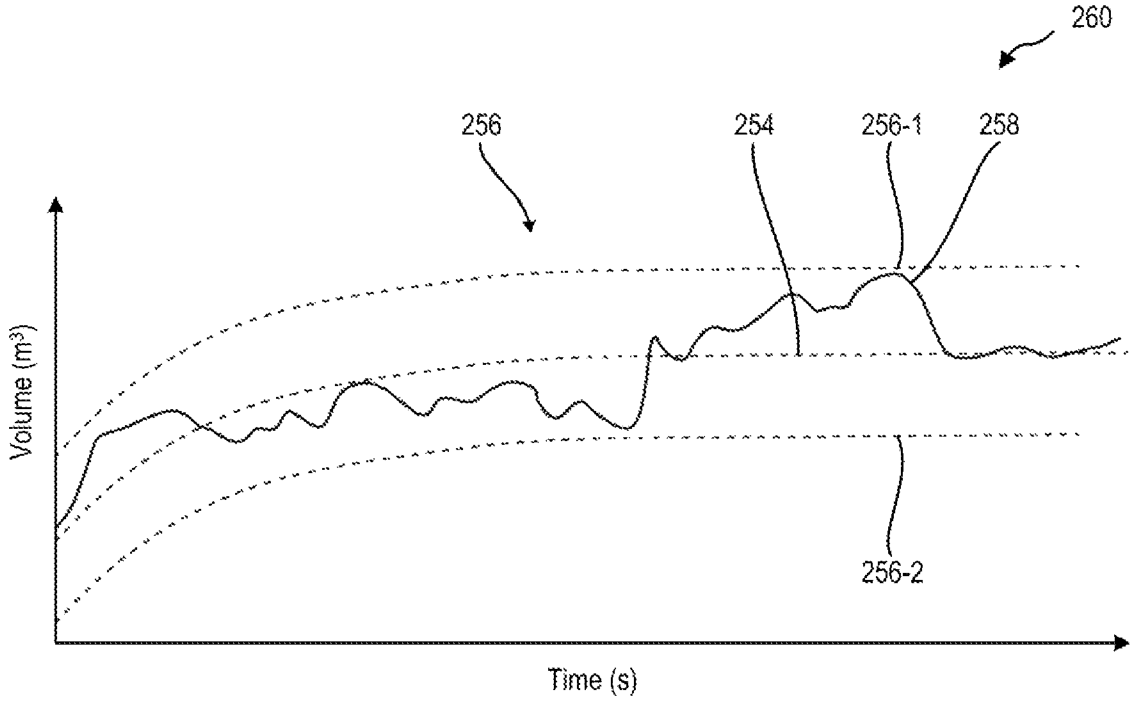
FIG. 6 illustrates an example of monitoring an active flowback in connection with a best fit curve and one or more thresholds, according to at least one embodiment of the present disclosure.
Figure 6:
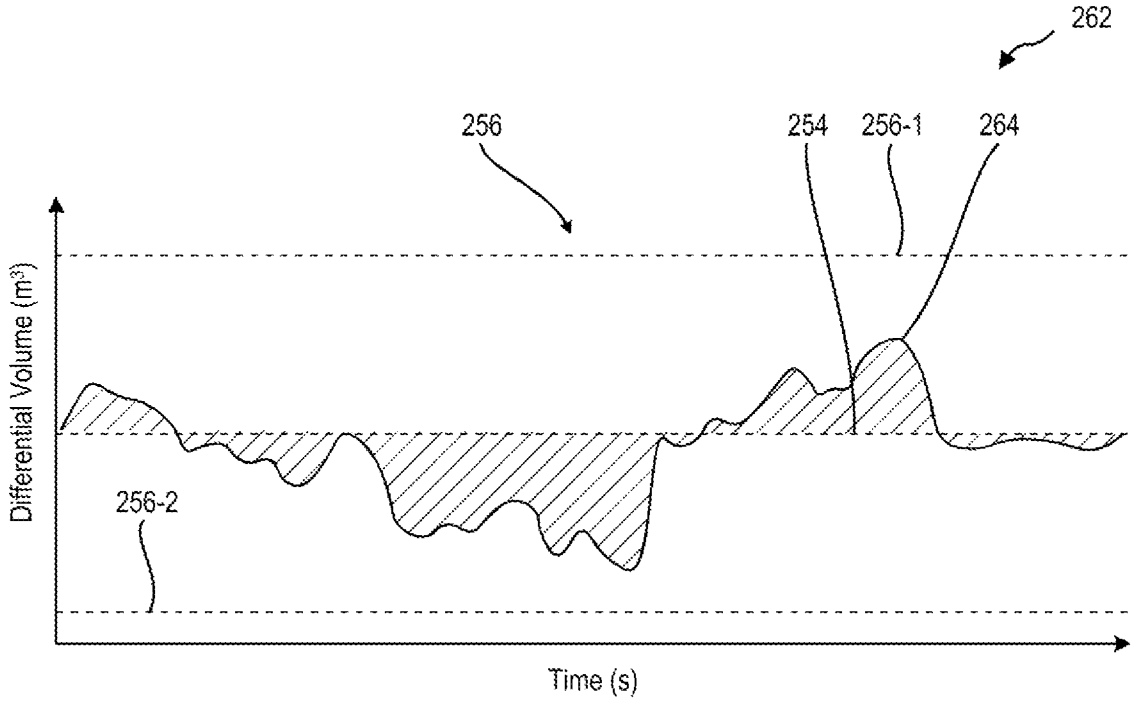

In some embodiments, the flowback alert manager 230 receives the flowback measurements of the active flowback from the sensor manager 222 (e.g., or accesses the active flowback data 234). As shown in FIG. 6, the flowback alert manager 230 may monitor the active flowback 258, for example, against the predicted or expected active flowback represented by the best fit curve 252. For example, the flowback alert manager 230 may generate and/or monitor a volumetric flowback over time 260 for both the best fit curve 252 and the active flowback 258. The flowback alert manager 230 may monitor the active flowback against one or more of the flowback thresholds 256 determined by the flowback threshold engine 228. For example, the volumetric flowback over time 260 may include the upper bound 256-1 and/or the lower bound 256-2. In some embodiments, the flowback alert manager 230 plots, graphs or otherwise displays the volumetric flowback over time 260.

In another example, the flowback alert manager 230 may generate and/or monitor a differential volumetric flowback over time 262. For example, the flowback alert manager 230 may generate and monitor a differential active flowback 264, or the difference of the active flowback 258 compared to the best fit curve 252. The flowback alert manager 230 may monitor the differential active flowback 264 against one or more of the flowback thresholds 256 determined by the flowback threshold engine 228. For example, the differential volumetric flowback over time 262 may include the upper bound 256-1 and/or the lower bound 256-2. In some embodiments, the flowback alert manager 230 plots, graphs, or otherwise displays the differential volumetric flowback over time 262.

Based on monitoring the active flowback (e.g., via the volumetric flowback over time 260 and/or the differential volumetric flowback over time 262) the flowback alert manager 230 may implement and/or generate one or more alerts. The alert may be any type or form of alert, alarm, indication, or flag associated with detecting an abnormal flowback. For example, the alert may be a visual or audible alert or any other communication for alerting a user to the abnormal flowback. The alert may be a flag, note, record, file, or data entry (and combinations thereof) saved to the data storage 232. The alert may be implemented in connection with hardware and/or software of the computing device 212 and/or the flowback monitoring system 220. In this way, the flowback alert manager 230 may generate an alert in one or more forms in order to alert to and/or record an instance of an abnormal active flowback.

As mentioned above, the volumetric flowback over time 260 and/or the differential volumetric flowback over time 262 may include one or more of the flowback thresholds 256 determined by the flowback threshold engine 228 (e.g., including the upper bound 256-1 and/or the lower bound 256-2). The flowback threshold(s) 256 may correspond with an or alert, or the flowback alert manager 230 may trigger an alert based on the flowback threshold 256.

Figure 7:
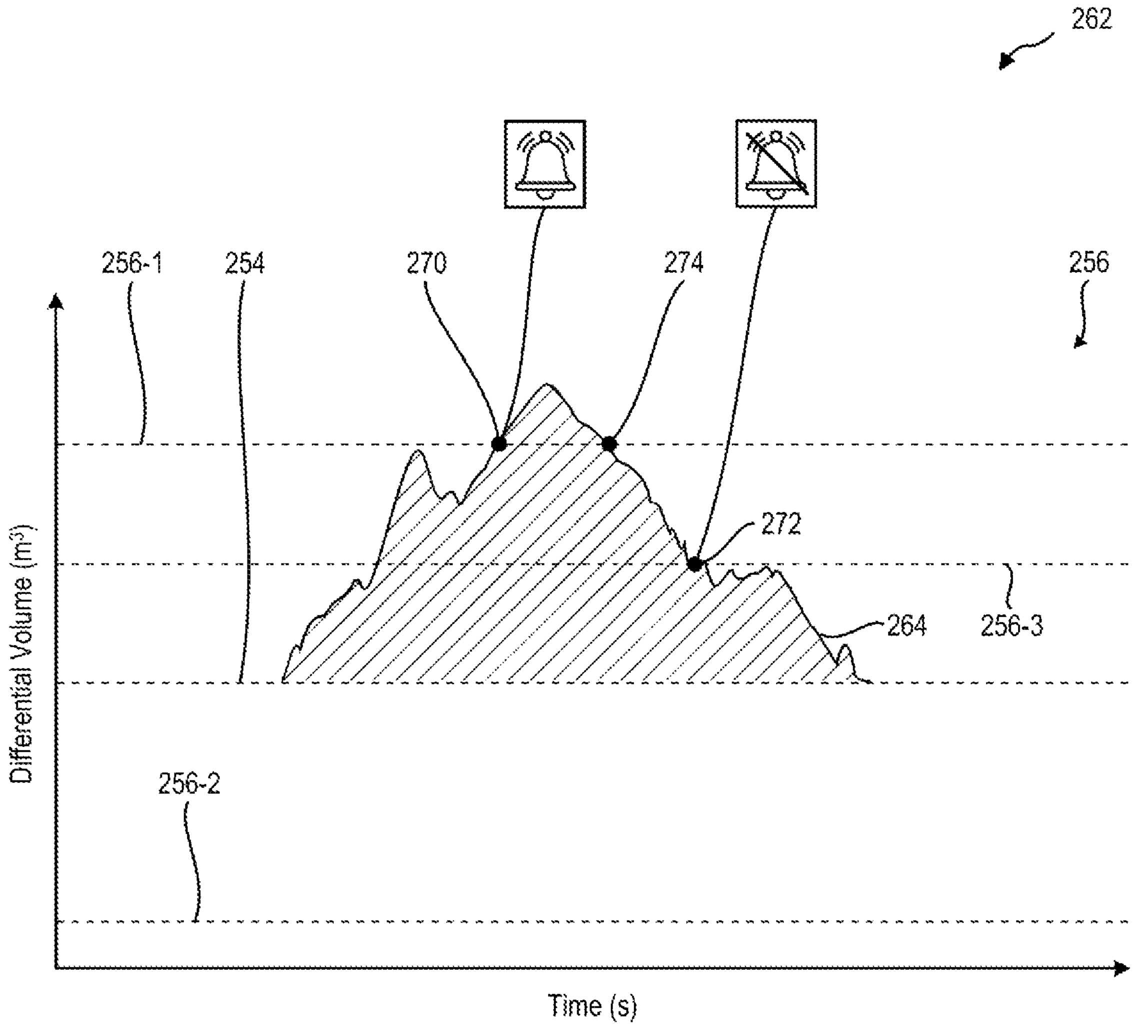
FIG. 7 illustrates an example implementation of an alert in connection with an active flowback, according to at least one embodiment of the present disclosure.

For example, FIG. 7 shows an example portion of the differential volumetric flowback over time 262. In some situations, the differential active flowback 264 may surpass or exceed one of the flowback thresholds 256, such as the upper bound 256-1, at a high alert point 270. The flowback alert manager 230 may accordingly generate an alert (e.g., a high alert) based on the high alert point 270. In some embodiments, the high alert corresponds with a formation kick associated with the wellbore. In this way, the flowback alert manager may generate an alert and/or alert a user to an excess amount of active flowback from the wellbore (e.g., a value in excess of a range of expected values).

Similarly, in some situations, the differential active flowback 264 may surpass or exceed one or more other thresholds, such as the lower bound 256-2. The flowback alert manager 230 may accordingly generate an alert (e.g., a low alert) based on a low alert point. In some embodiments, the low alert corresponds with a formation loss associated with the wellbore. In this way, the flowback alert manager may generate an alert and/or alert a user to a reduced amount of active flowback from the wellbore (e.g., a value below a range of expected values).

Additionally, it should be appreciated that the flowback alert manager 230 may implement and/or generate one or more alerts in connection with the volumetric flowback over time 260 (e.g., in connection with monitoring the active flowback 258), such that the flowback alert manager 230 is not limited to just the implementation shown in FIG. 7 of the differential volumetric flowback over time 262. For example, the flowback alert manager 230 may monitor the active flowback 258 of the volumetric flowback over time 260 and may generate one or more alerts based on the active flowback 258 surpassing or exceeding one or more of the flowback thresholds 256.

In this way, the flowback alert manager 230 may generate one or more alerts to indicate an abnormal level, amount, or rate of an active flowback from a wellbore, such as an excessive or a reduced amount of flowback compared to an expected or predicted flowback. Such an indication may be advantageous, for example, for detecting abnormal wellbore conditions such as an abnormal or unexpected influx of formation fluids into the wellbore (formation kick) or an abnormal loss of drilling fluid to the formation (formation loss). In some embodiments, one or more mitigating measures are taken in response to the alert by the flowback alert manager 230. For example, one or more drilling parameters may be adjusted, modified, or changed, (e.g., by a user, or automatically by the flowback monitoring system 220) to mitigate a wellbore condition associated with the active flowback and/or the alert. This functionality may help to reduce the risk of serious, cumbersome, and/or catastrophic wellbore events, such as blow out, formation/wellbore instability, valve damage or valve control issues, fluid circulation issues, or other wellbore issues (and combinations thereof). In this way, the alert generated by the flowback alert manager 230 may facilitate an efficient, effective, and safe operation of the downhole system.

In some embodiments, the flowback alert manager 230 implements an alert delay. The alert delay may be indicative of a time period during which the flowback alert manager 230 will not or does not generate one or more alerts. For example, the differential active flowback 264 (and/or the active flowback 258) may surpass one or more thresholds during the time period of the alert delay, and the flowback alert manager 230 may not generate a corresponding alert. The alert delay may be a period of time after a pump off period begins, or after receiving an indication of a pump off period. For example, the alert delay may be 10 s, 20 s, 30 s, 40 s, 50 s, 60 s, 90 s, 120 s, 240 s, 360 s, or any value therebetween. In some embodiments, it is critical that the alert delay be at least 120 s after the beginning of the pump off period in order to allow the active flowback to initialize and/or normalize such that the flowback may be accurately measured and/or characterized.

In some embodiments, the flowback alert manager 230 cancels, deletes, or otherwise turns off one or more alerts. For example, the flowback alert manager 230 may cancel an alert based on the differential active flowback 264 subsiding or passing back within one or more of the flowback thresholds 256. For example, the flowback alert manager 230 may observe the differential active flowback 264 surpassing the upper bound 256-1 (e.g., at the high alert point 270) and the flowback alert manager 230 may accordingly generate a high alert. In some situations, the differential active flowback 264 may subside and/or return back down to within the upper bound 256-1. The flowback alert manager 230 may accordingly cancel or turn off the high alert.

In another example, the flowback alert manager 230 may not cancel an alert based on the differential active flowback 264 returning past the same flowback threshold 256 which triggered the alert, but may maintain the alert until the observed flowback passes an additional flowback threshold 256. For example, a high alert may be triggered at the high alert point 270, and the differential active flowback 264 may subside passed or back within the upper bound 256-1 at a return point 274. The flowback alert manager 230 may not cancel the high alert at the return point 274, but may maintain the alert until the differential active flowback 264 passes back to within an alert-off threshold 256-3 at an alert-off point 272. In some embodiments, the alert-off threshold 256-3 is a narrower or tighter threshold (e.g., closer to the best fit curve 252) than the upper bound 256-1 that triggered the alert. For example, the upper bound 256-1 may be three standard deviations from the best fit curve 252 and the alert-off threshold may be 1 standard deviation from the best fit curve 252. In this way, the flowback alert manager 230 may implement the alert-off threshold 256-3 to prevent an alert indicating an abnormal active flowback from being periodically triggered and canceled and/or to ensure that an abnormal active flowback subsides to a sufficient degree so that the alert may be cancelled with confidence.

Figure 8:
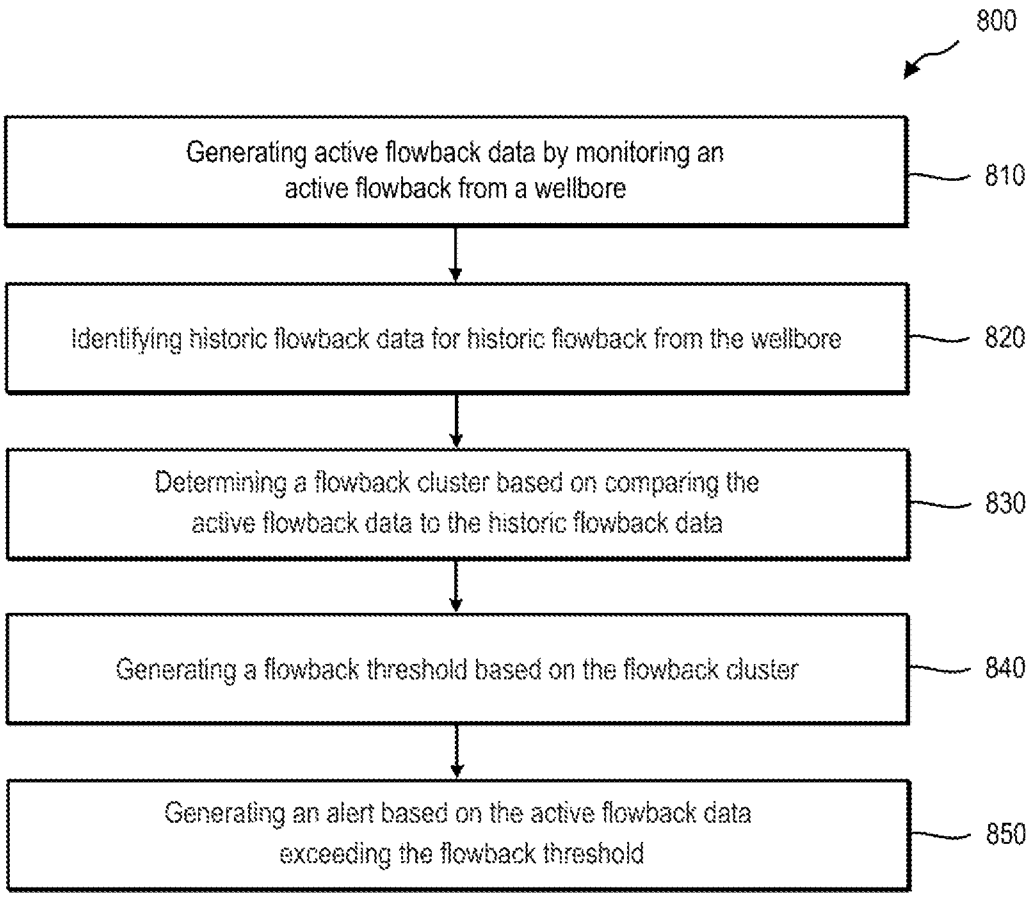
FIG. 8 illustrates a flow chart for a method or a series of acts for analyzing flowback of a downhole system as described herein, according to at least one embodiment of the present disclosure.

FIG. 8 illustrates a flow chart for a method 800 or a series of acts for analyzing flowback of a downhole system as described herein, according to at least one embodiment of the present disclosure. While FIG. 8 illustrates acts according to one embodiment, alternative embodiments may add to, omit, reorder, or modify any of the acts shown in FIG. 8.

In some embodiments, the method 800 includes an act 810 of generating active flowback data by monitoring an active flowback from a wellbore. For example, a flowback monitoring system may identify an active pump off period of a downhole system and may generate the active flowback data corresponding with the active pump off period.

In some embodiments, the method 800 includes an act 820 of identifying historic flowback data for historic flowback from the wellbore. In some embodiments, the flowback monitoring system generates the historic flowback data by monitoring historic flowback from the wellbore and caching the measurements as the historic blowback data. The historic flowback data may correspond with one or more previous pump off periods. For example, the historic data may be one or more instances of active flowback data that has been cached after the corresponding active pump off period has ended. In some embodiments, the active flowback data is generated during a same run of a downhole tool corresponding with the historic flowback data. For example, a cache of the historic flowback data may be cleared based on the downhole tool being tripped to the surface. In some embodiments, one or more data instances of the historic flowback data is cleared from the cache based on a time interval or an age of the data instances.

In some embodiments, the method 800 includes an act 830 of determining a flowback cluster based on comparing the active flowback data to the historic flowback data. For example, the flowback monitoring system may identify one or more instances of the historic flowback data that has similar prior conditions to that of the active flowback data. The similar prior conditions may include one or more of a flow rate, a depth of a downhole tool, a standpipe pressure, and a flow pattern. In some embodiments, the flowback monitoring system may filter, clear, or delete one or more instances of the historic flowback data based on a data quality of the one or more instances.

In some embodiments, the method 800 includes an act 840 of generating a flowback threshold based on the flowback cluster. For example, the flowback monitoring system may generate a flowback threshold having an upper bound and/or a lower bound. In some embodiments, the flowback monitoring system automatically generates the threshold in real time upon identifying an active pump off period.

In some embodiments, the method 800 includes an act 850 of generating an alert based on the active flowback data exceeding the flowback threshold. For example, the flowback monitoring system may generate the alert based on the active flowback data exceeding the upper bound. In some embodiments, a drilling parameter of the downhole system may be adjusted based on the alert. In some embodiments, the flowback monitoring system may cancel the alert based on the active flowback data passing an alert-off threshold.

The alert-off threshold may be different than the flowback threshold (e.g., different than the upper bound).

Figure 9:
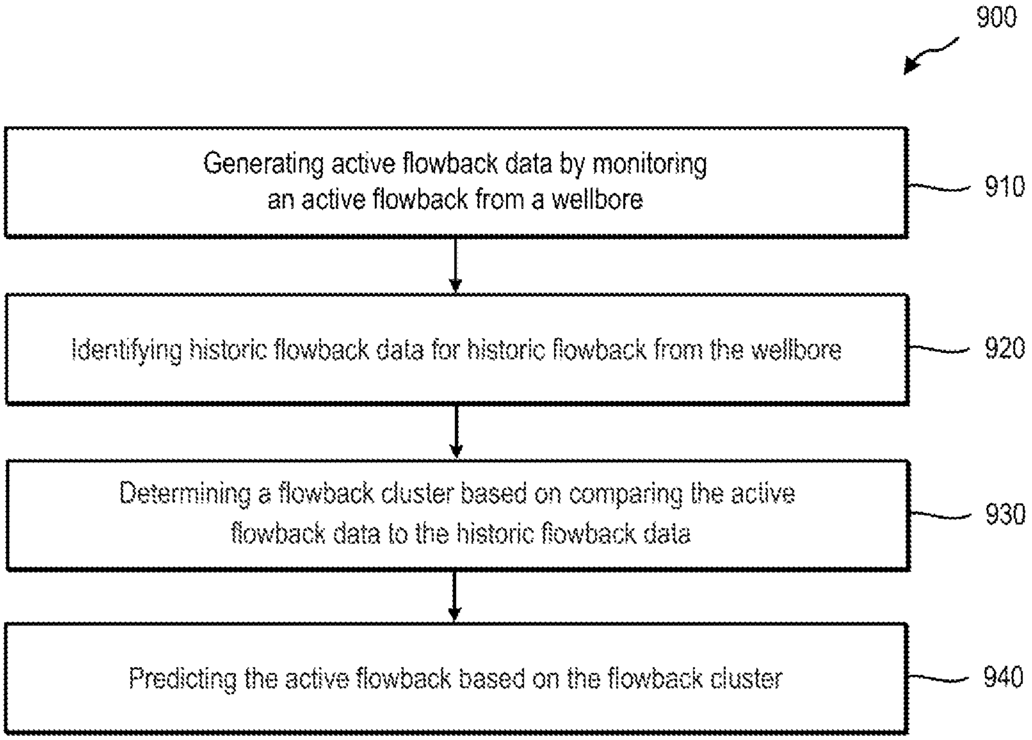
FIG. 9 illustrates a flow chart for a method or a series of acts for analyzing flowback of a downhole system as described herein, according to at least one embodiment of the present disclosure.

FIG. 9 illustrates a flow chart for a method 900 or a series of acts for analyzing flowback of a downhole system as described herein, according to at least one embodiment of the present disclosure. While FIG. 9 illustrates acts according to one embodiment, alternative embodiments may add to, omit, reorder, or modify any of the acts of FIG. 9.

In some embodiments, the method 900 includes an act 910 of generating active flowback data by monitoring an active flowback from a wellbore. In some embodiments, the method 900 includes an act 920 of identifying historic flowback data for historic flowback from the wellbore. In some embodiments, the method 900 includes and act 930 of determining a flowback cluster based on comparing the active flowback data to the historic flowback data.

In some embodiments, the method 900 includes an act 940 of predicting the active flowback based on the flowback cluster. For example, an flowback monitoring system may generate a best fit curve based on the flowback cluster. The flowback monitoring system may compute a probabilistic distribution of the flowback cluster based on the best fit curve. The flowback monitoring system may generate a threshold based on the probabilistic distribution. The threshold may be based on a standard deviation of the probabilistic distribution. In some embodiments, the probabilistic distribution is a Gaussian distribution.

Figure 10:
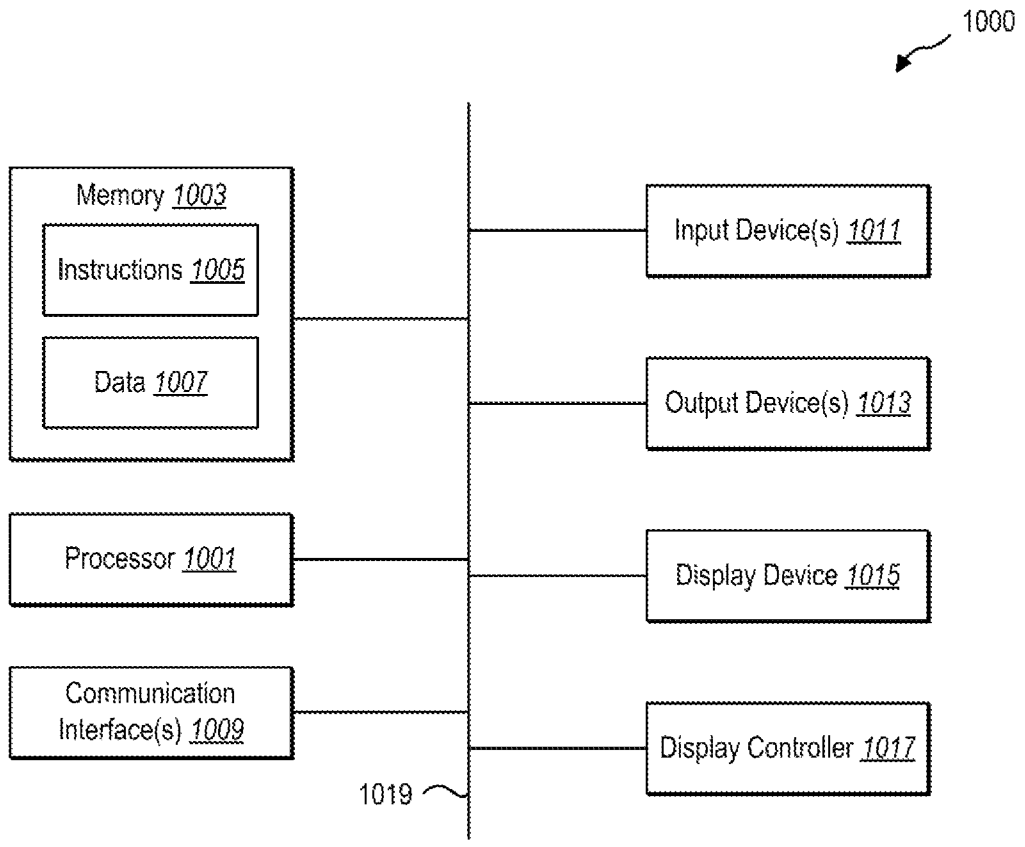
FIG. 10 illustrates certain components that may be included within a computer system.

Turning now to FIG. 10, this figure illustrates certain components that may be included within a computer system 1000. One or more computer systems 1000 may be used to implement the various devices, components, and systems described herein.

The computer system 1000 includes a processor 1001. The processor 1001 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1001 may be referred to as a central processing unit (CPU). Although just a single processor 1001 is shown in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1005 and data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during execution of the instructions 1005 by the processor 1001.

A computer system 1000 may also include one or more communication interfaces 1009 for communicating with other electronic devices. The communication interface(s) 1009 may be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1000 may also include one or more input devices 1011 and one or more output devices 1013. Some examples of input devices 1011 include a keyboard, mouse, microphone, remote control device, button, joystick, trackball, touchpad, and lightpen. Some examples of output devices 1013 include a speaker and a printer. One specific type of output device that is typically included in a computer system 1000 is a display device 1015. Display devices 1015 used with embodiments disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For the sake of clarity, the various buses are illustrated in FIG. 10 as a bus system 1019.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media may be any available media that may be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure may comprise at least two distinctly different kinds of computer-readable media: non-transitory computer-readable storage media (devices) and transmission media.

INDUSTRIAL APPLICABILITY

In some embodiments, a downhole system includes a drill rig used to turn a drilling tool assembly which extends downward into the wellbore. The drilling tool assembly may include a drill string, a bottomhole assembly (BHA), and a bit attached to the downhole end of drill string.

The drill string may include several joints of drill pipe connected end-to-end through tool joints. The drill string transmits drilling fluid through a central bore and transmits rotational power from the drill rig to the BHA. In some embodiments, the drill string further includes additional components such as subs, pup joints, etc. The drill pipe provides a hydraulic passage through which drilling fluid is pumped from the surface. The drilling fluid discharges through nozzles, jets, or other orifices in the bit for the purposes of cooling the bit and cutting structures thereon, and for lifting cuttings out of the wellbore as it is being drilled.

The BHA may include the bit or other components. An example BHA may include additional or other components (e.g., coupled between the drill string and the bit). Examples of additional BHA components include drill collars, stabilizers, measurement-while-drilling (MWD) tools, logging-while-drilling (LWD) tools, downhole motors, underreamers, section mills, hydraulic disconnects, jars, vibration or damping tools, other components, or combinations of the foregoing. The BHA may further include a rotary steerable system (RSS). The RSS may include directional drilling tools that change a direction of the bit, and thereby the trajectory of the wellbore. In some cases, at least a portion of the RSS maintains a geostationary position relative to an absolute reference frame, such as gravity, magnetic north, or true north. Using measurements obtained with the geostationary position, the RSS may locate the bit, change the course of the bit 110, and direct the directional drilling tools on a projected trajectory.

In general, the downhole system may include additional or other drilling components and accessories, such as special valves (e.g., kelly cocks, blowout preventers, and safety valves). Additional components included in the downhole system may be considered a part of the drilling tool assembly, the drill string, or a part of the BHA depending on their locations in the downhole system.

In some embodiments, a downhole motor in the BHA generates power for downhole systems and/or provides rotational energy for downhole components (e.g., rotate the bit). The downhole motor may be any type of downhole motor, including a positive displacement pump (such as a progressive cavity motor) or a turbine. In some embodiments, the downhole motor is powered by the drilling fluid. In other words, the drilling fluid pumped downhole from the surface may provide the energy to rotate a rotor in the downhole motor. The downhole motor may operate with an optimal pressure differential or pressure differential range. The optimal pressure differential may be the pressure differential at which the downhole motor may not stall, burn out, overspin, or otherwise be damaged. In some cases, the downhole motor drives the rotation of the bit. In some embodiments, the rotation of the bit is driven by a component at the surface of the wellbore.

The bit in the BHA may be any type of bit suitable for degrading downhole materials. For instance, the bit may be a drill bit suitable for drilling the earth formation. Example types of drill bits used for drilling earth formations are fixed-cutter or drag bits, and roller cone bits. In other embodiments, the bit may be a mill used for removing metal, composite, elastomer, other downhole materials, or combinations thereof. For instance, the bit may be used with a whipstock to mill into casing lining the wellbore. The bit may also be a junk mill used to mill away tools, plugs, cement, other materials within the wellbore, or combinations thereof. Swarf or other cuttings formed by use of a mill may be lifted to surface or may be allowed to fall downhole. In still other embodiments, the bit may include a reamer. For instance, an underreamer may be used in connection with a drill bit and the drill bit may bore into the formation while the underreamer enlarges the size of the bore.

As mentioned above, the downhole system may include or may implement a drilling fluid or drilling mud. In some embodiments, the downhole system includes a mud tank. The mud tank may be a reservoir for holding a volume of the drilling fluid. The drilling fluid may be pumped from the mud tank, through one or more fluid lines, and down the drilling tool assembly to the bit. As mentioned above, the drilling fluid may exit the drill bit, for example, at the bottom of the wellbore in order to cool the bit and/or to remove and carry away cuttings.

In some embodiments, the drilling fluid is implemented in this way and at least partially fills the wellbore. For example, the drilling fluid may be pumped through the drilling tool assembly and out the bit such that the wellbore may fill up, and the drilling fluid may flow out of the annular region of the wellbore around the drill string. In this way, the drilling fluid may flow upward through the annular region of the wellbore to carry formation cuttings and heat energy away from the bit. In this manner, the drilling fluid may circulate from the mud tank, down through the drilling tool assembly, back up the wellbore, and back to the mud tank.

During drilling operations, it may periodically be necessary to stop or pause pumping of the drilling fluid into the wellbore. For example, additional lengths of drill pipe may periodically be added to the drilling tool assembly as the bit advances downward through the earth formation, and the pumps supplying the drilling fluid to the drilling tool assembly may be turned off. In many situations, a volume of fluid (e.g., drilling fluid and/or formation fluid) may flow back up and/or out of the wellbore (e.g., the annular region) during the pump off period. For example, pumping the drilling fluid into the wellbore may create a pressure imbalance in the wellbore which may counterbalance formation pressures and influxes of formation fluids such as oil, gas, or water. Turning the pump off may release the pressure imbalance, and the formation pressures may cause the drilling fluid and/or formation fluids to flow up and out of the wellbore. Additionally, in many cases natural gas may become dissolved in the drilling fluid, and when the pressure of the drilling fluid is released, the natural gas may expand, leading to an increase in volume and a flow of the drilling fluid up and out of the wellbore. The flow of fluid up and out of the wellbore may be caused by a variety of other means.

This flow of fluid out of the wellbore after the pump(s) is turned off is known as flowback. Efforts may typically be made to control, predict, and/or expect certain volumes of flowback as well as to safely recover and handle the fluids. In some embodiments, an excess volume of flowback (e.g., higher than expected) is indicative of a well or formation kick, or the influx or flow of formation fluids into the wellbore from the formation. Detecting and responding to formation kicks may be crucial for maintaining well control and preventing more severe incidents such as blowouts, thus ensuring safe operation of the downhole system. In some embodiments, a reduced volume of flowback (e.g., lower than expected) is indicative of formation loss, or a (e.g., unexpected) loss of drilling fluid into the formation. Detecting and responding to formation loss may be crucial for maintaining well integrity, preventing damage to the surrounding formation, and maintaining sufficient hydrostatic pressure in the wellbore to control the well and prevent formation influxes. Thus, the interpretation and analysis of flowback patterns, known as flowback fingerprinting, may provide advantageous information for the efficient operation of the downhole system.

In some situations, however, it may be difficult to adequately and/or accurately characterize and/or interpret the flowback patterns observed in a downhole system. For example, many factors may affect how much and to what extent, flowback occurs after pump shut off. Accordingly, it may be difficult to accurately characterize and/or predict an expected amount of flowback in order to determine an excess or reduced amount of flowback during any given pump off period. Thus, improved systems and methods for detecting abnormal flowback may be beneficial over conventional techniques.

In some embodiments, the downhole system includes a computing device. The computing device may refer to a variety of computing devices including a mobile device such as a mobile telephone, smartphone, a laptop, or other mobile device. The computing devices may refer to non-mobile devices such as a desktop computer, a server device, or other non-portable devices. The computing device may be a surface computing device, a mobile computing device, a remote computing device, a downhole computing device, and combinations thereof. The computing device may be in electronic communication with one or more components of the downhole system such as sensors, electronic components, and other computing devices.

In some embodiments, the computing device includes a flowback monitoring system implemented thereon. As will be discussed in further detail below, the flowback monitoring system may facilitate monitoring, analyzing, and/or interpreting the flowback experienced by the downhole system, for example, during one or more pump off periods. In this way, the flowback monitoring system may facilitate a more accurate understanding and characterizing of one or more downhole conditions based on an observed flowback.

In some embodiments, a computing device has a flowback monitoring system implemented thereon. The flowback monitoring system may include a sensor manager, a data manager, a data cluster engine, a flowback threshold engine, and a flowback alert manager. Additionally, the flowback monitoring system may include a data storage including active flowback data, historic flowback data, and threshold data. While one or more embodiments described herein describe features and functionalities performed by specific components of the flowback monitoring system, it will be appreciated that specific features described in connection with one or more components of the flowback monitoring system may, in some examples, be performed by one or more of the other components of the flowback monitoring system.

By way of example, as will be discussed below, one or more features of the data manager may be delegated to other components of the flowback monitoring system. As another example, one or more instances of data may be selected and/or processed by the data cluster engine, and in some instances, some or all of these features may be performed by the flowback threshold engine (or other component of the flowback monitoring system). Indeed, it will be appreciated that some or all of the specific components may be combined into other components and specific functions may be performed by one or across multiple components of the flowback monitoring system.

As just mentioned, the flowback monitoring system includes a sensor manager. The sensor manager may be in data communication with one or more sensors and may monitor and/or manage the measurements and/or signals received from the sensors. In this way, the sensor manager may measure and/or monitor one or more parameters of the downhole system.

The flowback monitoring system may be connected to and/or may be in communication with sensors. The sensors may include one or more sensors implemented in or in connection with, the downhole system. In some embodiments, the sensors include a pump on/off sensor. As discussed above, the downhole system may pump drilling fluid down into the wellbore via the drilling tool assembly. In some situations, the pump may be turned off, such as to add or replace one or more sections of drill pipe, or to stop, adjust, or change an operation of the downhole system. The pump on/off sensor may monitor the state of the pump and may transmit the pump state or condition to the sensor manager. In this way, the flowback monitoring system may monitor a present operational state of the pump, for example, in order to detect a pump off period.

In some embodiments, the sensors include a flow rate sensor. The flow rate sensor may measure or detect a flow rate of the drilling fluid supplied to the wellbore. For example, the flow rate sensor may measure the flow rate of the drilling fluid into the drilling tool assembly. The flow rate sensor may measure or detect the flow rate of the drilling fluid, for example, at the surface of the wellbore. The flow rate sensor may measure the flow rate of the drilling fluid at the pump. The flow rate sensor may measure the flow rate of the drilling fluid at one or more locations in the drilling tool assembly, such as at the bit. As will be discussed in further detail below, the flow rate prior to a pump off period may be a prior condition associated with determining an abnormal flowback during the pump off period. Thus, measuring the flow rate in this way may facilitate characterizing an observed or active flowback. For this purpose, in some embodiments, the flow rate sensor constantly monitors the flow rate such that a prior flow rate is determined when a pump off period is identified. In some embodiments, the flow rate sensor periodically measures the flow rate, or is activated to measure the flow rate prior to the pump being turned off. In this way the flowback monitoring system may monitor and/or measure a flow rate of drilling fluid supplied to the wellbore prior to a pump off period.

In some embodiments, the sensors include a flowback sensor. The flowback sensor may measure a flow of fluid (e.g., drilling fluid and/or formation fluid) that flows from or out of the wellbore, (e.g., a flowback volume from the wellbore). The flowback sensor may measure a pattern of the flowback such as a rate and/or a total volume of fluid flowing from the wellbore. The flowback sensor may measure a rate and/or a total volume of fluid flowing into the mud tank and/or may measure a level or amount (e.g., an active volume) of fluid in the mud tank. In some embodiments, the flowback sensor constantly monitors the flowback, for example, during some or all of a drilling operation. In some embodiments, the flowback sensor periodically monitors the flowback during an some or all of a drilling operation. In some embodiments, the flowback sensor is activated during a pump off period such that the flowback sensor only monitors and/or measures the flowback while the pump is turned off. In this way, the flowback monitoring system may monitor and/or measure the flowback of fluid from or out of the wellbore.

In some embodiments, one or more of the flow rate sensor and the flowback sensor, either singly or in combination, monitors and/or measures (or facilitates monitoring and/or measuring) a flow pattern of the drilling fluid. For example, the movement and distribution of the drilling fluid within the wellbore may vary based on factors such as drilling techniques, wellbore conditions, drilling fluid properties, etc. As such, the sensor manager may monitor and/or measure the flow pattern in order to facilitate characterizing the flowback, as described herein.

In some embodiments, the sensors include a bit depth sensor. The bit depth sensor may monitor and/or measure the depth of one or more components of the downhole system, such as one or more downhole tools. For example, the bit depth sensor may measure the depth of a bit being used to lengthen and/or widen the wellbore. The measurement of the bit depth sensor may be taken in connection with a pump off period. For example, the depth of a downhole tool may be relevant to interpreting an associated flowback (e.g., measured at or near the surface), and the depth of the downhole tool may be measured prior to and/or during an associated pump off period. In this way, the flowback monitoring system may monitor one or more depths associated with a downhole operation.

In some embodiments, the sensors include a pressure sensor. The pressure sensor may measure a fluid pressure of the drilling fluid at one or more locations of the downhole system. For example, the pressure sensor may measure the drilling fluid pressure at the pump, at the standpipe, at one or more locations in the drilling tool assembly, at the bit, at one or more locations in the wellbore (e.g., the annular region), and combinations thereof. The pressure sensor may measure the drilling fluid pressure constantly, periodically, and/or may be triggered or activated corresponding with a pump off period (e.g., to measure the pressure prior to the pump off period). In this way, the flowback monitoring system may monitor the drilling fluid pressure at one or more locations in the downhole system.

It should be understood that the downhole system and the flowback monitoring system are not limited to including those sensors discussed above, but that the sensors may include any other sensor (or may omit one or more sensors) and/or the sensor manager may be connected to and/or in communication with one or more sensors in addition to that discussed herein. Indeed, the sensors may include any sensor for monitoring and/or taking measurements of one or more parameters (e.g., prior conditions) relevant to monitoring, measuring, and/or characterizing flowback as described herein. Additionally, the various sensors described herein may be implemented as one or more physical sensing devices, as one or more computations based on signals from physical sensing devices, and combinations thereof. For example, the pump on/off sensor may be a physical sensor that detects the active state of a pump, or may be a computation based on another signal that the pump is on or off, such as the flow rate sensor. In this way, the term sensor should be understood to encompass a device for the physical sensing of a condition or measurement, as well as a software implementation for a computation associated with a condition or measurement (and combinations thereof).

As mentioned above, the flowback monitoring system may include a data manager. The data manager may receive data or information (e.g., from the sensor manager) corresponding to one or more sensor measurements. The data manager may save and/or store the sensor measurements to the data storage (e.g., as active flowback data and/or historic flowback data as discussed below). In some embodiments, the data manager associates one or more types and/or instances of the sensor measurements with each other. For example, the data manager may receive flowback measurements and may map or associate the flowback measurements with flow rate measurements, flow pattern measurements, depth measurements, pressure measurements, any other measurements taken by and/or accessible to the data manager, and combinations thereof. In accordance with at least one embodiment of the present disclosure, the data manager associates the flowback measurements with the (e.g., prior) flow rate measurements.

In some embodiments, the data manager receives the pump on/off measurements from the sensor manager corresponding with a pump on or off period. The data manager may save and/or store one or more of the sensor measurements based on receiving an indication of a pump off period. The data manager may associate or map two or more measurements and/or instances of the sensor measurements based on receiving an indication of a pump off period.

In some embodiments, at least some of the sensor measurements are associated with a prior condition of the downhole system and/or wellbore. For example, the sensor manager may monitor and/or measure one or more aspects of the downhole system prior to a pump off period. Upon receiving an indication of a pump off period, the data manager may save and/or store one or more measurements and/or instances of the sensor measurements prior to the pump off period as a prior condition of the wellbore associated with the pump off period. For example, the data manager may receive a pump off indication, and may recall the flow rate, pressure, depth, flow pattern, or any other measurement (and combinations thereof), and may save these measurements as a prior condition of the pump off period. The prior condition(s) may be one or more measurements taken within (e.g., prior to) 10 seconds, 30 seconds, 1 minute, 2 minutes, 4 minutes, 5 minutes, or 10 minutes (or any values therebetween) of the beginning of a pump off period. In some embodiments it is critical that each prior condition be a measurement taken within 2 minutes of the initiation of the pump off period in order that the measurement of the prior condition accurately reflect the state and/or behavior of the well associated with the flowback measurements taken during the pump off period (e.g., taken after the prior condition). Each prior condition may be calculated or associated with an average, minimum, maximum, mean, median, mode, range, or any other value or range of values of the prior condition measurements. In this way, the flowback measurements taken during a pump off period may be associated with one or more prior conditions indicative of observable well conditions at the time the pump is turned off.

In some embodiments, saving the prior condition(s) is associated with monitoring and/or measuring and/or storing the (e.g., active) flowback measurements after the indication of the initialization of a pump off period. In this way, the flowback may be measured, for example, during a pump off period, and one or more prior conditions of the downhole system and/or wellbore may be saved and/or associated with the measurement of the active (e.g., pump-off) flowback. As will be discussed below, mapping and/or associating the flowback to the prior conditions of the wellbore may facilitate characterizing and/or interpreting the flowback measurements.

As mentioned above, the data storage may include active flowback data and historic flowback data. In some embodiments, the data manager receives the sensor measurements and stores them as active flowback data. For example, the sensor manager may receive a pump off indication and may begin recording and/or saving the flowback measurements as active flowback data, corresponding to an active flowback of the downhole system. The data manager may recall and save the prior conditions associated with the active flowback and/or the active pump off period as (e.g., part of) the active flowback data. In this way, the active flowback data may include flowback measurements and prior conditions associated with and/or based on an active pump off period of the downhole system.

In some embodiments, the data manager stores and/or caches some or all of the active flowback data as historic flowback data. The data manager may cache the active flowback data based on one or more trigger conditions, such as a period of time elapsing after a pump has turned off, a pump turning back on, and/or a flowback stopping or becoming identified as stable (e.g., not abnormal). For example, the data manager may record and/or store the active flowback data during some or all of an active pump off period. Based on receiving an indication of the pump turning back on (e.g., the active pump off period ending) the data manager may migrate the active flowback data for the (now past) pump off period and save the data as historic flowback data. In some embodiments, the data manager may clear the active flowback data in preparation for measuring and/or storing (e.g., new) active flowback data corresponding with a next pump off period. The data manager may begin recording and/or storing additional (e.g., new) sensor measurements as the active flowback data. In this way the active flowback data may include and/or may be associated with measurements corresponding to only an active (or upcoming) pump off period, and the historic flowback data may include measurements associated with one or more previous pump off periods (e.g., previous instances of active flowback data). In this way, as discussed below, the active flowback data may be compared to the historic flowback data in order to facilitate accurately characterizing and interpreting an active flowback of the downhole system.

In some embodiments, the data manager clears or deletes one or more data instances from the data storage. For example, in some situations it may be determined that the historic flowback data is less relevant and/or valuable for comparison with the active flowback data when it does not occur and/or is not measured within a certain time frame. Accordingly, the data manager may clear or delete one or more instances of the historic flowback data based on the instances having a threshold age or occurring before a threshold time interval. In some embodiments, the data manager clears data instances from the historic flowback data that are more than 1 hour, 2 hours 3 hours, 4 hours, 5 hours, 6 hours, 7 hours, 8 hours, 9 hours, or 10 hours (or any value therebetween) old (e.g., that occur more than that much time prior to the active flowback data and/or an active pump off period). In another example, in some situations it may be determined that the historic flowback data is less relevant and/or valuable for comparison with the active flowback data when it does not occur during a same downhole operation, type of downhole operation, or run of a downhole tool. Accordingly, the data manager may clear or delete some or all of the historic flowback data based on a downhole tool being tripped from the wellbore, and/or based on a change in a downhole operation or type of downhole operation. In this way, the data manager may maintain the data in the data storage such that the historic flowback data is most relevant, useful, and/or valuable for facilitating the characterization and/or interpretation of an active flowback.

As mentioned above, the flowback monitoring system may include a data cluster engine. The data cluster engine may sort, index, filter and/or select one or more instances of the historic flowback data in the data storage. For example, the data cluster engine may select a flowback cluster, or one or more instances of the historic flowback data (e.g., corresponding to one or more previous pump off periods) and may save or store the flowback cluster to the data storage as threshold data. The flowback cluster and the threshold data may facilitate comparing one or more previously observed flowbacks of the wellbore for use in comparing with an active flowback (e.g., comparing with the active flowback data) in order to characterize and/or interpret the flowback.

In some embodiments, the data cluster engine automatically selects the flowback cluster based on the pump on/off period. For example, the data cluster engine may receive an indication that the pump has turned off, and may automatically sort, filter, and/or select one or more instances of the historic flowback data as the flowback cluster and may store the flowback cluster to the data storage as threshold data. The data cluster engine may select the flowback cluster at any other time or based on any other trigger.

In some embodiments, the data cluster engine filters and/or sorts the historic flowback data and may clear, delete, flag, and/or isolate one or more instances of the historic flowback data (and/or active flowback data) from the data storage. The data cluster engine may flag, filter, or clear data instances based on a data quality of the data. For example, in some situations one or more measurements and/or data instances may be or may become corrupted, incomplete, disjointed, unclear or otherwise be of poor quality. In some situations, the data cluster engine identifies one or more measurements and/or data instances as inaccurate, uncalibrated, unexpected, or as an outlier. These sensor and/or data and/or measurement errors may be a result of a sensor malfunctioning, becoming disconnected or damaged, or any other reason. The data cluster engine may accordingly flag, separate, filter, and/or delete some or all of one or more measurements and/or data instances of the historic flowback data and/or the active flowback data. In this way, the data cluster engine may maintain a quality of the measurement and/or data of the flowback monitoring system.

The data cluster engine may select the flowback cluster based on the data instances being well suited for evaluating an active flowback and/or being more relevant to the characterization of the active flowback. For example, one or more instances of the historic flowback data may be relevant and/or useful for comparison with the active flowback data when the data instances have one or more similar features to that of the active flowback data.

In some embodiments, the flowback cluster is automatically selected based on one or more of the prior conditions associated with the active flowback data and the historic flowback data. For example, the data cluster engine may sort, rank, categorize, list, or otherwise organize the historic flowback data based on one or more of the prior conditions associated with the historic flowback data. In accordance with at least one embodiment of the present disclosure, the data cluster engine organizes the historic flowback data based on the prior flow rate measurements associated with the historic flowback data (e.g., the flow rate prior to each pump off period associated with each data instance). The data cluster engine may organize the historic flowback data based on the pressure measurements, depth measurements, flow pattern measurements, any other measurements, and combinations thereof.

After sorting the historic flowback data, the data cluster engine may select one or more data instances of the historic flowback data as the flowback cluster. For example, the data cluster engine may select 1, 2, 3, 4, 5, 6, 7, 8, 9, or 10 (or any value therebetween) data instances of the historic flowback data to comprise the flowback cluster. In some embodiments, it is critical that the flowback cluster comprise three data instances of the historic flowback data in order that the flowback threshold and/or envelope (as discussed below) is not too narrow or too wide. This may facilitate properly and accurately characterizing the active flowback and preventing false positive and false negative alerts resulting from improperly calculated and/or sized thresholds.

The data cluster engine may select the flowback cluster based on a similarity of the prior condition(s) of the historic flowback data with the prior condition(s) of the active flowback data. For example, the flowback cluster may be selected based on the data instances having a prior flow rate within a predefined range compared to the active flowback data. The flowback cluster may be selected based on the prior flow rate of the data instances being with a range of 10, 20, 40, 50, 100, 150, or 200 gal/min (or any value therebetween) of the prior flow rate of the active flowback data. For example, the data cluster engine may select all of the data instances falling within the given range or may select a specific quantity of data instances that are closest to the flow rate of the active flowback data (e.g., while also in the given range). In some embodiments, it is critical that the flow rate(s) of the flowback cluster be within a range of 50 gal/min of the active flowback data to ensure that the flowback cluster is sufficiently representative of the wellbore conditions of the active flowback data.

In another example, the flowback cluster may be selected based on the data instances having a similar or close depth to the active flowback data (e.g., a depth of a downhole tool prior to and/or during the corresponding pump off period). The flowback cluster may be selected based on the depth of the data instances being within a range of 25 m, 50 m, 100 m, 150 m, 200 m, 250 m, 300 m, 400 m, or 500 m, (or any value therebetween) of the depth of the active flowback data. For example, the data cluster engine may select all of the data instances falling within the given range or may select a specific quantity of data instances that are closest to the depth of the active flowback data. In some embodiments, it is critical that the depth(s) of the flowback cluster be within a range of 200 m of the active flowback data to ensure that the flowback cluster is sufficiently representative of the wellbore conditions at or near the depth of a downhole tool during the active pump off period of the active flowback data. The data cluster engine may select the flowback cluster based on similarity of any other measurements of prior conditions of the historic flowback data to that of the active flowback data.

In some embodiments, the data cluster engine selects the flowback cluster based on two or more prior conditions. For example, the flowback cluster may be selected based on one or more instances of the historic flowback data having similar (e.g., close) flow rates and depth to that of the active flowback data. In another example, the flowback cluster may be selected based on one or more instances of the historic flowback data having similar (e.g., close) pressure and depth to that of the active flowback data. The flowback cluster may be selected based on one or more instance of the historic flowback data having any other combination of similar prior conditions and/or measurements.

In some embodiments, the data cluster engine determines that one or more (or all) of the data instances of the historic flowback data do not have a prior condition (of the various prior conditions) that are sufficiently similar or close to that of the active flowback data. The data cluster engine may accordingly not select one or more data instance for the flowback cluster based on that prior condition and may proceed to compare and/or select one or more data instance for the flowback cluster based on another prior condition or another measurement. In some embodiments, this selective process is based on a hierarchy or order of relevance of the prior conditions and/or other measurements to the characterization of the active flowback.

For example, the data cluster engine may sort the historic flowback data based on a first prior condition, such as flow rate, and may determine that none (or not enough) of the historic flowback data has a prior flow rate within a threshold of the prior flow rate of the active flowback data. The data cluster engine may accordingly not select one or more data instances for the flowback cluster based on the flow rate and may proceed to sort the historic flowback data based on a second prior condition, such as depth. The data cluster engine may select one or more data instance for the flowback cluster based on depth measurements of a downhole tool taken or measured at similar depths to the active flowback data. This process may proceed through any number of prior conditions and/or measurements until the data cluster engine selects a flowback cluster based on a sufficient similarity to the active flowback data.

In some embodiments, the data cluster engine selects one or more data instances for the flowback cluster based on a first prior condition or measurement and may further refine and/or filter the selected data instances based on a second prior condition or measurement by adding and/or removing one or more data instances to the flowback cluster.

In this way, the data cluster engine may determine the flowback cluster by selecting one or more data instances of the historic flowback data based on the data instances having one or more similar features to that of the active flowback data. In this way, defining a flowback cluster of the historic flowback data based on similarities to the active flowback data may help to more accurately characterize and/or interpret the active flowback data.

In some embodiments, the data cluster engine determines that an insufficient amount (or none) of the data instances of the historic flowback data have sufficient similarity to the active flowback data based on one or more prior conditions, other measurements, or any other basis. The data cluster engine may accordingly not select and/or not define a flowback cluster. In some embodiments, the data cluster engine indicates to the flowback monitoring system that a flowback cluster was not defined, for example, such that thresholding and/or alerting may not be performed.

As mentioned above, the flowback monitoring system may include a flowback threshold engine. The flowback threshold engine may access and/or process some or all of the data in the data storage in order to predict a value, rate, and/or behavior of an active flowback.

In some embodiments, the flowback threshold engine generates or fits a curve to one or more instances of the historic flowback data. For example, based on the flowback cluster, the flowback threshold engine may generate a best fit curve representative of the flowback cluster. In some embodiments, the flowback threshold engine generates a best fit curve for each of the data instances of the data cluster. In some embodiments, the flowback threshold engine generates a best fit curve for all of the data instances of the flowback cluster. The best fit curve may be generated using any curve fitting technique, such as linear, polynomial, logarithmic, trigonometric, power, exponential, moving average, or any other curve fitting technique (and combinations thereof). The flowback threshold engine may save or store the best fit curve to the data storage as (or as part of) threshold data.

In accordance with at least one embodiment of the present disclosure, the best fit curve may be generated based on a hyperbolic tangent function. For example, the best fit curve may be fit based on the formula:

$$y = A * \tanh(Bx) = A * \frac{e^{2Bx} - 1}{e^{2Bx} + 1}$$

One or more embodiments may change, augment, and/or simplify this example formula or one or more parts of this example formula. In some embodiments, a best fit curve based on a hyperbolic tangent function (such as that shown above) approximates the general shape of the flowback measurements for flowback typically observed flowing from a wellbore. For example, adjusting the variable A may adjust a slope of the curve, and adjusting the variable B may adjust an asymptote of the curve. In this way the best fit curve may be fit to one or more data instances of the flowback cluster such that the best fit curve approximates a trend of the flowback cluster.

In accordance with at least one embodiment of the present disclosure, the flowback threshold engine may generate a best fit curve for the flowback cluster (e.g., a curve that it a best fit for all of the data instances of the flowback cluster). The best fit curve may approximate the behavior of all of the data instances of the flowback cluster. As discussed above, the flowback cluster may be determined or selected based on historic data instances with similar features (e.g., prior conditions) to that of an active flowback being actively observed. In this way, the best fit curve may approximate and/or predict the behavior of the active flowback and/or the best fit curve may represent a curve or a set of values that the active flowback is expected to follow. For example, upon detecting a pump-off period, the data cluster engine may (e.g., automatically) select the flowback cluster and the flowback threshold engine may (e.g., automatically) generate the best fit curve for the flowback cluster. In this way, the behavior of the active flowback may be (e.g., automatically) predicted once the pump off period is detected.

In some embodiments, the flowback threshold engine determines and/or generates a probabilistic distribution of the flowback cluster. The flowback threshold engine may determine a probabilistic distribution of the flowback cluster against, and/or over, and/or fitted to the best fit curve. For example, for one or more (or all) points or increments in the domain (e.g., time), the flowback threshold engine may determine a probabilistic distribution of the flowback cluster (e.g., over the best fit curve) at the corresponding domain point or (e.g., time) increment. In some embodiments, the probabilistic distribution is a Gaussian or normal probability distribution. In some embodiments, the probabilistic distribution is a Bayesian probability distribution. The probabilistic distribution may be any probabilistic distribution and/or may be based on any form or statistical theory such as discrete, continuous, binomial, Poisson, Bernoulli, hypergeometric, normal, uniform, exponential, chi-squared, logistic, student's T, any other distributions, and combinations thereof. The flowback threshold engine may save or store the probabilistic distribution to the data storage as threshold data.

In some embodiments, the probabilistic distribution incorporates and/or may be based on or against the best fit curve. For example, the probabilistic distribution may be generated such that the best fit curve is and/or represents one or more of a mean, median, mode, average, quartile, variance, standard deviation, any other probabilistic or statistical value, and combinations thereof. In this way, the best fit curve may predict an expected, ideal, or smooth behavior of the active flowback, and the probabilistic distribution may facilitate defining and/or characterizing any departure or divergence of the observed, active flowback from the prediction of the best fit curve.

In some embodiments, the flowback threshold engine determines and/or generates a flowback threshold. The flowback threshold engine may generate the flowback threshold 256 based at least in part on the best fit curve and/or the probabilistic distribution. For example, the probabilistic distribution may define a probability that a given flowback measurement occurs at its measured value out of a range of all possible values for a given time interval. The flowback threshold may be generated based on encompassing, capturing, and/or limiting a percentage of all possible values for each measurement at each time interval within a threshold probability or percentage (e.g., centered on the prediction). The flowback threshold engine may save or store the flowback threshold to the data storage as threshold data.

In this way, the flowback threshold engine may generate one or more flowback thresholds which may indicate a value or range of values of flowback measurements at a threshold probability or percentage of departure from an expected value (e.g., best fit curve) for the flowback measurements. For example, the flowback threshold(s) may represent an amount or degree of acceptable and/or safe departure for a measured active flowback from the best fit curve, and an active flowback measurement passing or exceeding one or more of the flowback thresholds may indicate an active flowback that is excessive and/or undesirable. In accordance with at least one embodiment of the present disclosure, the flowback threshold is based on one or more standard deviations of the probabilistic distribution. For example, the flowback threshold may capture or encompass all possible flowback measurement values within 1, 2, or three standard deviations from the best fit curve, or any value therebetween (and combinations thereof). In some embodiments it is critical that the flowback threshold encompasses three standard deviations above and/or below the best fit curve in order to facilitate characterizing a flowback measurement outside of the flowback threshold as abnormal with a sufficiently high confidence. For example, the flowback threshold may include an upper bound that is three standard deviations above the best fit curve, and a lower bound that is three standard deviations below the best fit curve. In this way, the best fit curve and/or the probabilistic distribution may facilitate characterizing and/or interpreting a departure or divergence of a measured (e.g., active) flowback from an expected or predicted range of values based on the best fit curve.

As discussed above, in some embodiments, the flowback cluster is not generated and/or selected, such as due to a lack of suitable data instance of the historic flowback data. In some embodiments, the flowback threshold engine does not generate one or more of the best fit curve, the probabilistic distribution, and one or more flowback thresholds. Not generating one or more of these features may help to eliminate false positive and/or false negative indications of abnormal and/or undesirable flowback (as discussed below) that may occur by generating predictions and/or thresholds based on insufficient and/or inadequate historical data.

In some embodiments, the flowback threshold engine generates one or more of the best fit curve, the probabilistic distribution, and one or more flowback thresholds based on data other than the flowback cluster. (e.g., in situations where the flowback cluster has not been selected). For example, the flowback threshold engine may generate one or more of these features based on all of the historic data. In another example, the flowback threshold engine may generate one or more of these features based on one or more data instances of the historic data that has features closest or most similar to that of the active flowback data For instance, there may not be enough (or any) data instances that are sufficiently within the predefined thresholds for selecting the flowback cluster, and the flowback threshold engine may select and use one or more of the next closes data instance (based on one or more prior condition measurements) for generating one or more of these features. In this way, the flowback threshold engine may provide at least some indication of an expectation or prediction for the active flowback, for example, in situations where a flowback prediction according to the more specific and/or improved techniques described herein may not be possible.

As mentioned above, the flowback monitoring system may include a flowback alert manager. The flowback alert manager may access and/or process some or all of the data in the data storage (e.g., the threshold data) in order to detect an abnormal active flowback and generate one or more alarms or alerts.

In some embodiments, the flowback alert manager receives the flowback measurements of the active flowback from the sensor manager (e.g., accesses the active flowback data). The flowback alert manager may monitor the active flowback, for example, against the predicted or expected active flowback represented by the best fit curve. For example, the flowback alert manager may generate and/or monitor a volumetric flowback over time for both the best fit curve and the active flowback. The flowback alert manager may monitor the active flowback against one or more of the flowback thresholds determined by the flowback threshold engine. For example, the volumetric flowback over time may include the upper bound and/or the lower bound. In some embodiments, the flowback alert manager plots, graphs or otherwise displays the volumetric flowback over time.

In another example, the flowback alert manager may generate and/or monitor a differential volumetric flowback over time. For example, the flowback alert manager may generate and monitor a differential active flowback, or the difference of the active flowback compared to the best fit curve. The flowback alert manager may monitor the differential active flowback against one or more of the flowback thresholds determined by the flowback threshold engine. For example, the differential volumetric flowback over time may include the upper bound and/or the lower bound. In some embodiments, the flowback alert manager plots, graphs, or otherwise displays the differential volumetric flowback over time.

Based on monitoring the active flowback (e.g., via the volumetric flowback over time and/or the differential volumetric flowback over time) the flowback alert manager may implement and/or generate one or more alerts. The alert may be any type or form of alert, alarm, indication, or flag associated with detecting an abnormal flowback. For example, the alert may be a visual or audible alert or any other communication for alerting a user to the abnormal flowback. The alert may be a flag, note, record, file, or data entry (and combinations thereof) saved to the data storage. The alert may be implemented in connection with hardware and/or software of the computing device and/or the flowback monitoring system. In this way, the flowback alert manager may generate an alert in one or more forms in order to alert to and/or record an instance of an abnormal active flowback.

As mentioned above, the volumetric flowback over time and/or the differential volumetric flowback over time may include one or more of the flowback thresholds determined by the flowback threshold engine (e.g., including the upper bound and/or the lower bound). The flowback threshold(s) may correspond with an or alert, or the flowback alert manager may trigger an alert based on the flowback threshold.

In some situations, the differential active flowback may surpass or exceed one of the flowback thresholds, such as the upper bound, at a high alert point. The flowback alert manager may accordingly generate an alert (e.g., a high alert) based on the high alert point. In some embodiments, the high alert corresponds with a formation kick associated with the wellbore. In this way, the flowback alert manager may generate an alert and/or alert a user to an excess amount of active flowback from the wellbore (e.g., a value in excess of a range of expected values).

Similarly, in some situations, the differential active flowback may surpass or exceed one or more other thresholds, such as the lower bound. The flowback alert manager may accordingly generate an alert (e.g., a low alert) based on a low alert point. In some embodiments, the low alert corresponds with a formation loss associated with the wellbore. In this way, the flowback alert manager may generate an alert and/or alert a user to a reduced amount of active flowback from the wellbore (e.g., a value below a range of expected values).

Additionally, it should be appreciated that the flowback alert manager may implement and/or generate one or more alerts in connection with the volumetric flowback over time (e.g., in connection with monitoring the active flowback), such that the flowback alert manager is not limited to just the implementation of the differential volumetric flowback over time described above. For example, the flowback alert manager may monitor the active flowback of the volumetric flowback over time and may generate one or more alerts based on the active flowback surpassing or exceeding one or more of the flowback thresholds.

In this way, the flowback alert manager may generate one or more alerts to indicate an abnormal level, amount, or rate of an active flowback from a wellbore, such as an excessive or a reduced amount of flowback compared to an expected or predicted flowback. Such an indication may be advantageous, for example, for detecting abnormal wellbore conditions such as an abnormal or unexpected influx of formation fluids into the wellbore (formation kick) or an abnormal loss of drilling fluid to the formation (formation loss). In some embodiments, one or more mitigating measures are taken in response to the alert by the flowback alert manager. For example, one or more drilling parameters may be adjusted, modified, or changed, (e.g., by a user, or automatically by the flowback monitoring system) to mitigate a wellbore condition associated with the active flowback and/or the alert. This may help to reduce the risk of serious, cumbersome, and/or catastrophic wellbore events, such as blow out, formation/wellbore instability, valve damage or valve control issues, fluid circulation issues, or other wellbore issues (and combinations thereof). In this way, the alert generated by the flowback alert manager may facilitate an efficient, effective, and safe operation of the downhole system.

In some embodiments, the flowback alert manager implements an alert delay. The alert delay may be a time period during which the flowback alert manager will not or does not generate one or more alerts. For example, the differential active flowback (and/or the active flowback) may surpass one or more thresholds during the time period of the alert delay, and the flowback alert manager may not generate a corresponding alert. The alert delay may be a period of time after a pump off period begins, or after receiving an indication of a pump off period. For example, the alert delay may be 10 s, 20 s, 30 s, 40 s, 50 s, 60 s, 90 s, 120 s, 240 s, 360 s, or any value therebetween. In some embodiments, it is critical that the alert delay be at least 120 s after the beginning of the pump off period in order to allow the active flowback to initialize and/or normalize such the flowback may be accurately measured and/or characterized.

In some embodiments, the flowback alert manager cancels, deletes, or otherwise turns off one or more alerts. For example, the flowback alert manager may cancel an alert based on the differential active flowback subsiding or passing back within one or more of the flowback thresholds. For example, the flowback alert manager may observe the differential active flowback surpassing the upper bound (e.g., at the high alert point) and the flowback alert manager may accordingly generate a high alert. In some situations, the differential active flowback may subside and/or return back down to within the upper bound. The flowback alert manager may accordingly cancel or turn off the high alert.

In another example, the flowback alert manager may not cancel an alert based on the differential active flowback returning past the same flowback threshold which triggered the alert, but may maintain the alert until the observed flowback passes an additional flowback threshold. For example, a high alert may be triggered at the high alert point, and the differential active flowback may subside passed or back within the upper bound at a return point. The flowback alert manager may not cancel the high alert at the return point, but may maintain the alert until the differential active flowback passes back to within an alert-off threshold at an alert-off point. In some embodiments, the alert-off threshold is a narrower or tighter threshold (e.g., closer to the best fit curve) than the upper bound that triggered the alert. For example, the upper bound may be three standard deviations from the best fit curve and the alert-off threshold may be one standard deviation from the best fit curve. In this way, the flowback alert manager may implement the alert-off threshold to prevent an alert indicating an abnormal active flowback from being periodically triggered and canceled and/or to ensure that an abnormal active flowback subsides to a sufficient degree so that the alert may be cancelled with confidence.

In some embodiments, a method or a series of acts analyzing flowback of a downhole system includes an act of generating active flowback data by monitoring an active flowback from a wellbore. For example, a flowback monitoring system may identify an active pump off period of a downhole system and may generate the active flowback data corresponding with the active pump off period.

In some embodiments, the method includes an act of identifying historic flowback data for historic flowback from the wellbore. In some embodiments, the flowback monitoring system generates the historic flowback data by monitoring historic flowback from the wellbore and caching the measurements as the historic blowback data. The historic flowback data may correspond with one or more previous pump off periods. For example, the historic data may be one or more instances of active flowback data that has been cached after the corresponding active pump off period has ended. In some embodiments, the active flowback data is generated during a same run of a downhole tool corresponding with the historic flowback data. For example, a cache of the historic flowback data may be cleared based on the downhole tool being tripped to the surface. In some embodiments, one or more data instances of the historic flowback data is cleared from the cache based on a time interval or an age of the data instances.

In some embodiments, the method includes an act of determining a flowback cluster based on comparing the active flowback data to the historic flowback data. For example, the flowback monitoring system may identify one or more instances of the historic flowback data that has similar prior conditions to that of the active flowback data. The similar prior conditions may include one or more of a flow rate, a depth of a downhole tool, a standpipe pressure, and a flow pattern. In some embodiments, the flowback monitoring system may filter, clear, or delete one or more instances of the historic flowback data based on a data quality of the one or more instances.

In some embodiments, the method includes an act of generating a flowback threshold based on the flowback cluster. For example, the flowback monitoring system may generate a flowback threshold having an upper bound and/or a lower bound. In some embodiments, the flowback monitoring system automatically generates the threshold in real time upon identifying an active pump off period.

In some embodiments, the method includes an act of generating an alert based on the active flowback data exceeding the flowback threshold. For example, the flowback monitoring system may generate the alert based on the active flowback data exceeding the upper bound. In some embodiments, a drilling parameter of the downhole system may be adjusted based on the alert. In some embodiments, the flowback monitoring system may cancel the alert based on the active flowback data passing an alert-off threshold. The alert-off threshold may be different than the flowback threshold (e.g., different than the upper bound).

In some embodiments, a method or a series of acts for analyzing a flowback of a downhole system includes an act 910 of generating active flowback data by monitoring an active flowback from a wellbore. In some embodiments, the method includes an act of identifying historic flowback data for historic flowback from the wellbore. In some embodiments, the method includes an act of determining a flowback cluster based on comparing the active flowback data to the historic flowback data.

In some embodiments, the method includes an act of predicting the active flowback based on the flowback cluster. For example, an flowback monitoring system may generate a best fit curve based on the flowback cluster. The flowback monitoring system may compute a probabilistic distribution of the flowback cluster based on the best fit curve. The flowback monitoring system may generate a threshold based on the probabilistic distribution. The threshold may be based on a standard deviation of the probabilistic distribution. In some embodiments, the probabilistic distribution is a Gaussian distribution.

In some embodiments, one or more computer systems may be used to implement the various devices, components, and systems described herein.

The computer systems may respectively include a processor. The processor may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor may be referred to as a central processing unit (CPU). Although just a single processor is described herein in connection with the computer system, in an alternative configuration, a combination of processors (e.g., an ARM and DSP) could be used.

The computer systems may also respectively include memory in electronic communication with the processor. The memory may be any electronic component capable of storing electronic information. For example, the memory may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions and data may be stored in the memory. The instructions may be executable by the processor to implement some or all of the functionality disclosed herein. Executing the instructions may involve the use of the data that is stored in the memory. Any of the various examples of modules and components described herein may be implemented, partially or wholly, as instructions stored in memory and executed by the processor. Any of the various examples of data described herein may be among the data that is stored in memory and used during execution of the instructions by the processor.

The one or more computer systems may also include one or more communication interfaces for communicating with other electronic devices. The communication interface(s) may be based on wired communication technology, wireless communication technology, or both. Some examples of communication interfaces include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The one or more computer systems may also include one or more input devices and one or more output devices. Some examples of input devices include a keyboard, mouse, microphone, remote control device, button, joystick, trackball, touchpad, and lightpen. Some examples of output devices include a speaker and a printer. One specific type of output device that is typically included in a computer system is a display device. Display devices used with embodiments disclosed herein may utilize any suitable image projection technology, such as liquid crystal display (LCD), light-emitting diode (LED), gas plasma, electroluminescence, or the like. A display controller may also be provided, for converting data stored in the memory into text, graphics, and/or moving images (as appropriate) shown on the display device.

The various components of the computer systems may be coupled together by one or more buses, which may include a power bus, a control signal bus, a status signal bus, a data bus, etc.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media may be any available media that may be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure may comprise at least two distinctly different kinds of computer-readable media: non-transitory computer-readable storage media (devices) and transmission media.

The embodiments of the flowback monitoring system have been primarily described with reference to wellbore drilling operations. The flowback monitoring system described herein may be used in applications other than the drilling of a wellbore. In other embodiments, the flowback monitoring system according to the present disclosure may be used outside a wellbore or other downhole environment used for the exploration or production of natural resources. For instance, the flowback monitoring system of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Various features are described herein in alternative format in order to emphasize that features may be combined in any number of combinations. Each feature should be considered to be combinable with each other feature unless such features are mutually exclusive. The term "or" as used herein is not exclusive unless the contrary is clearly expressed. For instance, having A or B encompasses A alone, B alone, or the combination of A and B. In contrast, having only A or B encompasses A alone or B alone, but not the combination of A or B. Even if not expressly recited in multiple independent form, the description provides support for each claim being combined with each other claim (or any combination of other claims).

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of analyzing flowback of a downhole system during a pump-off period, the method comprising:

generating, by a flowback sensor, active flowback data by monitoring an active flowback from a wellbore during the pump-off period, wherein the active flowback data includes at least one of a volume of flowback, a flowback rate, or a mud tank level;

identifying cached historic flowback data for historic flowback from the wellbore collected during a prior pump-off period;

determining a flowback cluster based on comparing the active flowback data to the historic flowback data, the flowback cluster including a plurality of data of the historic flowback data within a threshold range of the active flowback data;

automatically generating a flowback threshold by:

fitting a best-fit curve to the flowback cluster;

computing a probabilistic distribution based on the best-fit curve; and generating the flowback threshold based on the probabilistic distribution, wherein the flowback threshold comprises an upper bound at +3 standard deviations from the best-fit curve and a lower bound at −3 standard deviations from the best-fit curve;

automatically generating an alert based on the active flowback data exceeding the flowback threshold, wherein the alert is automatically generated only when the active flowback data exceeds the flowback threshold after a delay of a specified number of seconds from initiation of the pump-off period, and the alert is maintained until the active flowback data returns within ±1 standard deviation of the best-fit curve;

responsive to the alert, generating a mitigating measure to mitigate a wellbore condition associated with the active flowback; and automatically implementing the mitigating measure by adjusting a drilling parameter of a drill rig to adjust rotation of a bit connected to the drill rig through a drill string.

2. The method of claim 1, wherein the active flowback data is generated during a same run of a downhole tool corresponding with the historic flowback data.

3. The method of claim 1, wherein determining the flowback cluster includes identifying at least one instance of the historic flowback data having similar prior conditions as the active flowback data.

4. The method of claim 3, wherein the similar prior conditions include at least one of a flow rate, a depth of a downhole tool, a standpipe pressure, or a flow pattern.

5. The method of claim 1, wherein the flowback threshold includes an upper bound, and wherein generating the alert is based on the active flowback data exceeding the upper bound.

6. The method of claim 1, wherein determining the flowback cluster includes filtering at least one instance of the historic flowback data based on a data quality of the at least one instance.

7. The method of claim 1, further comprising clearing a cache of the cached historic flowback data based on tripping a downhole tool from the wellbore.

8. The method of claim 1, further comprising clearing at least one instance of the cached historic flowback data from a cache of the historic flowback data based on a time interval.

9. The method of claim 1, further comprising canceling the alert based on the active flowback data passing an alert-off threshold that is different than the flowback threshold.

10. The method of claim 1, wherein the flowback threshold is automatically generated in real time upon identifying an active pump-off period.

11. A method of analyzing flowback of a downhole system during a pump-off period, the method comprising:

generating, by a flowback sensor, active flowback data by monitoring an active flowback from a wellbore during the pump-off period, wherein the active flowback data includes at least one of a volume of flowback, a flowback rate, or a mud tank level;

identifying cached historic flowback data for historic flowback from the wellbore collected during a prior pump-off period;

determining a flowback cluster based on comparing the active flowback data to the historic flowback data, the flowback cluster including a plurality of data of the historic flowback data within a threshold range of the active flowback data;

automatically predicting the active flowback based on the flowback cluster by:

fitting a best-fit curve to the flowback cluster;

computing a probabilistic distribution based on the best-fit curve;

generating a flowback threshold based on the probabilistic distribution, wherein the flowback threshold comprises an upper bound at +3 standard deviations from the best-fit curve and a lower bound at −3 standard deviations from the best-fit curve;

predicting the active flowback based on the flowback threshold; and automatically generating an alert based on the active flowback exceeding the flowback threshold, wherein the alert is automatically generated only when the active flowback data exceeds the flowback threshold after a delay of a specified number of seconds from initiation of the pump-off period, and the alert is maintained until the active flowback data returns within ±1 standard deviation of the best-fit curve;

responsive to the alert, generating a mitigating measure to mitigate a wellbore condition associated with the active flowback; and automatically implementing the mitigating measure by adjusting a drilling parameter of a drill rig to adjust rotation of a bit connected to the drill rig through a drill string.

12. The method of claim 11, wherein the probabilistic distribution is a gaussian distribution.

13. A system, comprising:

at least one processor;

memory in electronic communication with the at least one processor;

a flowback sensor configured to generate active flowback data by monitoring an active flowback from a wellbore during a pump-off period, wherein the active flowback data includes at least one of a volume of flowback, a flowback rate, or a mud tank level; and instructions stored in the memory, the instructions being executable by the at least one processor to:

identify cached historic flowback data for historic flowback from the wellbore collected during a prior pump-off period;

determine a flowback cluster based on comparing the active flowback data to the historic flowback data, the flowback cluster including a plurality of data of the historic flowback data within a threshold range of the active flowback data;

automatically generate a flowback threshold by:

fitting a best-fit curve to the flowback cluster;

computing a probabilistic distribution based on the best-fit curve; and generate the flowback threshold based on the probabilistic distribution, wherein the flowback threshold comprises an upper bound at +3 standard deviations from the best-fit curve and a lower bound at −3 standard deviations from the best-fit curve;

automatically generate an alert based on the active flowback data passing the flowback threshold, wherein the alert is automatically generated only when the active flowback data exceeds the flowback threshold after a delay of a specified number of seconds from initiation of the pump-off period, and the alert is maintained until the active flowback data returns within ±1 standard deviation of the best-fit curve;

responsive to the alert, generate a mitigating measure to mitigate a wellbore condition associated with the active flowback; and automatically implement the mitigating measure by adjusting a drilling parameter of a drill rig to adjust rotation of a bit connected to the drill rig through a drill string.

14. The system of claim 13, wherein the active flowback data is generated during a same run of a downhole tool corresponding with the historic flowback data.

15. The system of claim 13, wherein determining the flowback cluster includes identifying at least one instance of the historic flowback data having similar prior conditions as the active flowback data.

16. The method of claim 1, wherein determining the flowback cluster comprises selecting three historic instances that have a prior flow rate (i) within a specified number of gallons per minute of the prior flow rate measured within a threshold number of minutes from the initiation of the pump-off period and (ii) were measured at a bit depth within a threshold number of meters of the active flowback data.

17. The method of claim 1, wherein adjusting the drilling parameter includes adjusting a flow of drilling fluid through the drill string.

18. The method of claim 1, wherein adjusting the drilling parameter includes closing a safety valve.

* * * * *